United States Patent

Imamura

(10) Patent No.: US 9,436,519 B2
(45) Date of Patent: Sep. 6, 2016

(54) PROCESS COOPERATION METHOD, PROCESS COOPERATION PROGRAM, AND PROCESS COOPERATION SYSTEM

(71) Applicant: FUJITSU LIMITED, Kawasaki-shi, Kanagawa (JP)

(72) Inventor: Nobutaka Imamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/668,537

(22) Filed: Mar. 25, 2015

(65) Prior Publication Data

US 2015/0301872 A1    Oct. 22, 2015

(30) Foreign Application Priority Data

Apr. 21, 2014  (JP) .................................. 2014-087240

(51) Int. Cl.
*G06F 9/46*  (2006.01)
*G06F 9/52*  (2006.01)

(52) U.S. Cl.
CPC ...................................... *G06F 9/52* (2013.01)

(58) Field of Classification Search
None
See application file for complete search history.

(56) References Cited

U.S. PATENT DOCUMENTS

| 6,141,349 A * | 10/2000 | Ikeda ................. H04L 12/4637 370/403 |
| 6,209,039 B1 * | 3/2001 | Albright ............. H04L 12/2854 340/1.1 |
| 8,099,469 B2 * | 1/2012 | Furtner ............. H04L 12/40019 709/208 |
| 2007/0230347 A1 | 10/2007 | Imamura |
| 2007/0277019 A1 * | 11/2007 | Imamura ................. G06F 9/542 712/29 |
| 2007/0288646 A1 | 12/2007 | Imamura |

FOREIGN PATENT DOCUMENTS

| JP | 10-105420 | 4/1998 |
| JP | 2007-272694 | 10/2007 |
| JP | 2007-316955 | 12/2007 |
| JP | 2007-316956 | 12/2007 |

\* cited by examiner

*Primary Examiner* — Sisley Kim
(74) *Attorney, Agent, or Firm* — Fujitsu Patent Center

(57) ABSTRACT

A process cooperation method includes storing in a first storage device a first process result as a result of execution of a first process by a first processor and transmitting the first process result to a second processor, storing in a second storage device a second process result as a result of execution of a second process by the second processor based on the first process result received from the first processor, and transmitting the second process result to a third processor, and moreover transmitting the second process result and an identifier identifying the third processor to the first processor, and storing in the first storage device the second process result and the identifier received from the second processor by the first processor in association with the first process result.

14 Claims, 32 Drawing Sheets

FIG. 8A

CONTRACT INFORMATION

| CONTRACTOR ID | SENSOR ID | SENSOR NAME |
|---|---|---|
| 123 | 3 | ROOM TEMPERATURE SENSOR |
|  | 12 | MOTION SENSOR |
| 124 | 3 | ROOM TEMPERATURE SENSOR |
|  | 17 | HUMIDITY SENSOR |
| 125 | 3 | ROOM TEMPERATURE SENSOR |

FIG. 8B

PRESENCE/ABSENCE INFORMATION

| CONTRACTOR ID | PRESENCE/ABSENCE SITUATION |
|---|---|
| 123 | ABSENT |
| 124 | PRESENT |
| 125 | PRESENT |

FIG. 23

E-MAIL DELIVERY DESTINATION INFORMATION

| CONTRACTOR ID | E-MAIL ADDRESS 1 | E-MAIL ADDRESS 2 |
|---|---|---|
| 123 | AAA@BBB | — |
| 124 | DDD@BBB | EEE@BBB |
| 125 | GGG@FFF | — |

PROCESS COOPERATION METHOD, PROCESS COOPERATION PROGRAM, AND PROCESS COOPERATION SYSTEM

CROSS-REFERENCE TO RELATED APPLICATION

This application is based upon and claims the benefit of priority of the prior Japanese Patent Application No. 2014-087240, filed on Apr. 21, 2014, the entire contents of which are incorporated herein by reference.

FIELD

The present invention relates to a process cooperation method, a process cooperation program, and a process cooperation system.

BACKGROUND

Some business systems (a customer management system and the like) have, e.g., a function of outputting a result (output data) to a request (input data) by causing a plurality of processes to cooperate with each other and executing the processes. In the business system described above, each process unit executes the process when the process unit receives the result of the process executed by the prior process unit. Subsequently, each process unit transmits the process result of its process to the predetermined next process unit. With this, it becomes possible for the individual process units to execute the processes while cooperating with each other (see, e.g., Japanese Patent Application Laid-open No. H10-105420).

SUMMARY

In the process performed in the business system described above, there are cases where the process which outputs the same process result to the same input data is present. In such cases, by storing the combination of the input data and the output data in each process unit, when newly received input data matches the previously stored input data, the process unit transmits the output date corresponding to the received input data to the next process unit without performing its process. With this, for example, it becomes possible to reduce process time in the entire business system.

However, there are cases where the individual processes performed in the business system are distributed over a plurality of physical machines. For example, in the case where the above business system is a system which handles a huge volume of data such as big data, an amount of time needed for communication between the plurality of the physical machines becomes a huge amount of time. As a result, even when the combination of the input data and the output data is stored in each process unit, there are cases where it is difficult to reduce the process time in the entire business system.

According to an aspect of the embodiments, a process cooperation method includes: first storing, by a first processor, in a first storage device a first process result as a result of execution of a first process, and first transmitting, by the first processor, the first process result to a second processor; second storing, by a second processor, in a second storage device a second process result as a result of execution of a second process based on the first process result received from the first processor, and second transmitting, by the first processor, the second process result to a third processor, and moreover other second transmitting, by the first processor, the second process result and a third identifier identifying the third processor to the first processor; third storing, by the first processor, in the first storage device the second process result and the third identifier received from the second processor in association with the first process result; and extracting, by the first processor, the second process result and the third identifier stored in association with the first process result and fourth transmitting, by the first processor, the second process result to the third processor identified by the third identifier, in a case where a process result of the first process, which is executed after the third storing in the first storage device, matches the first process result stored in the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8A is a view for explaining the summary of the execution management process in the first embodiment.

FIG. 8B is a view for explaining the summary of the execution management process in the first embodiment.

FIG. 23 is a view for explaining the execution management process in the second embodiment.

DESCRIPTION OF EMBODIMENTS

[The Configuration of an Information Processing System]

Figure 1:
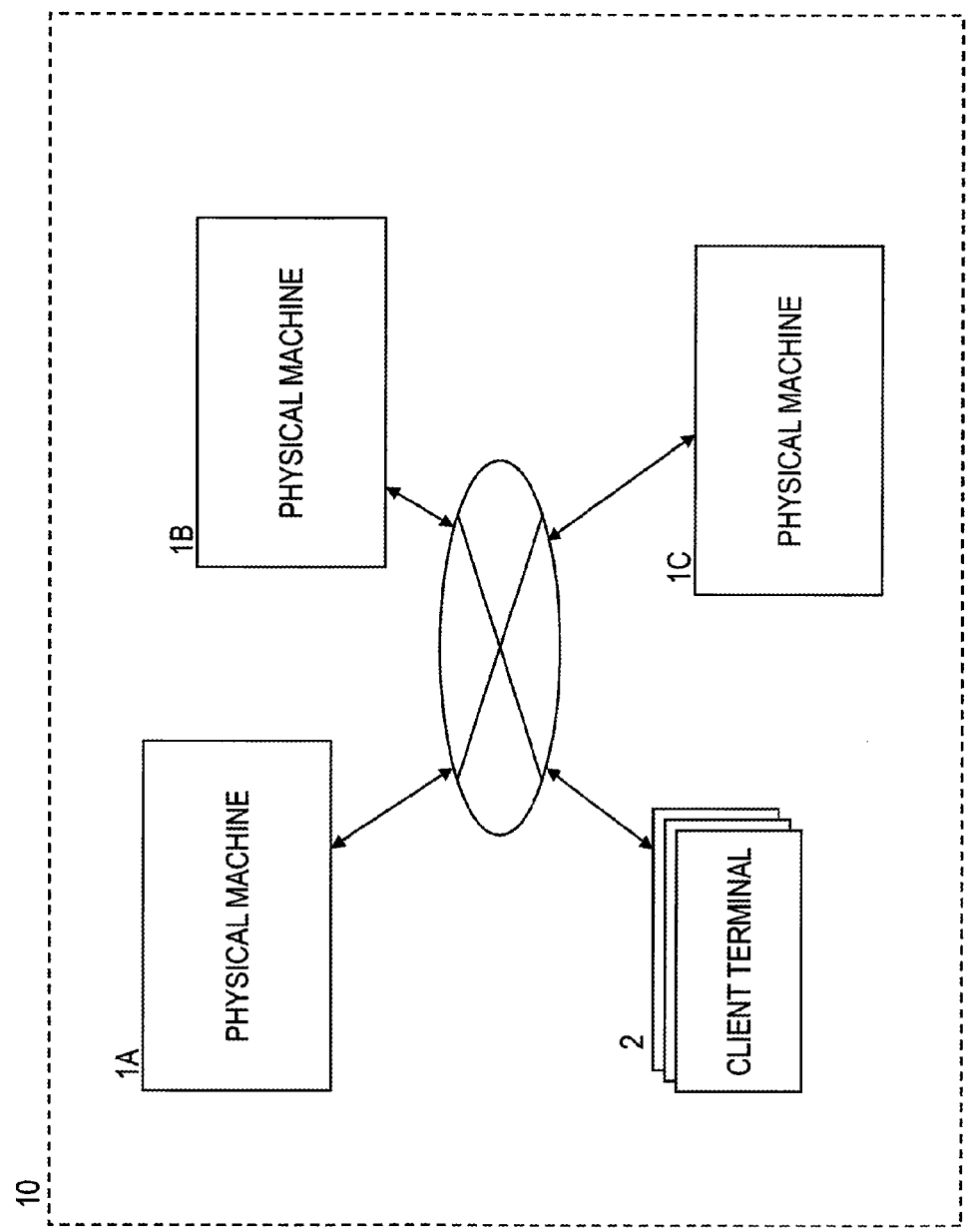
FIG. 1 is a view illustrating the entire configuration of an information processing system.

FIG. 1 is a view illustrating the entire configuration of an information processing system. In an information processing system 10 (hereinafter also referred to as a process cooperation system 10) illustrated in FIG. 1, a physical machine 1A, a physical machine 1B, and a physical machine 1C can access each other via a network such as the Internet or an intranet. A client terminal 2 can access the physical machine 1A, the physical machine 1B, and the physical machine 1C via the network. Each of the physical machines may be provided in, e.g., a data center. In an example in FIG. 1, the case where the configuration has three physical machines will be described, but the configuration having two or less or four or more physical machines may also be adopted.

In the case where each physical machine receives process request data (hereinafter also referred to as data or input data) from, e.g., the client terminal 2, the physical machine performs a process based on the process request data. Subsequently, the physical machine having performed the process transmits the process result to the client terminal 2 having transmitted the process request data. The client terminal 2 may be used for a business operator which provides services to a user (hereinafter also referred to as a contractor) to cause the physical machine to execute the process. Alternatively, the client terminal 2 may also be used for the user to directly cause the physical machine to execute the process.

The process performed by each physical machine is query processing which is executed by a physical machine-resident query. The query processing may also be complex event processing (hereinafter also referred to as CEP) which continuously executes the process and outputs the process result every time input data is received. The input data in this case may be not only data inputted from the client terminal 2 but also data which is continuously acquired by, e.g., a cellular phone owned by the contractor, a motion sensor installed in a house of the contractor, or a meteorological satellite. Each physical machine performs the process based on the input data described above, whereby it becomes possible to notify the contractor at a proper timing of information items useful for the contractor such as the situation of the house (presence or absence of a suspicious person) and weather in the neighborhood of the house.

Figure 2:
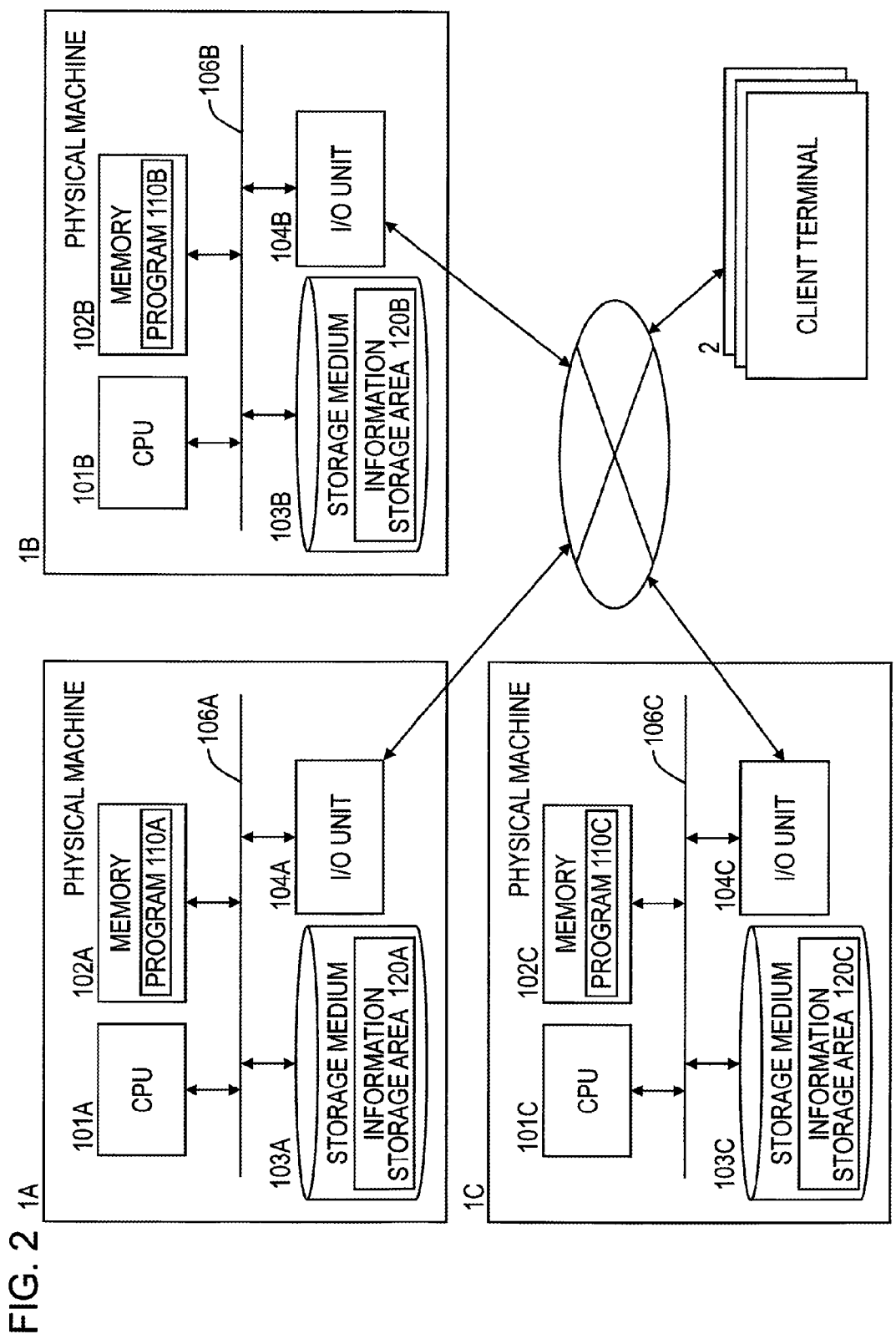
FIG. 2 is a view illustrating the hardware configuration of the physical machine.

FIG. 2 is a view illustrating the hardware configuration of the physical machine. The physical machine 1A illustrated in FIG. 2 has a CPU (processor) 101A as a processor, a memory 102A, a storage medium 103A, and an external interface 104A (I/O unit 104A). The individual units are connected to each other via a bus 106A. The storage medium 103A stores a program 110A for performing a process of managing the execution of each process (hereinafter also referred to as an execution management process) in, e.g., a program storage area (not illustrated) in the storage medium 103A. As illustrated in FIG. 2, the CPU 101A loads the program 110A to the memory 102A from the storage medium 103A at the time of the execution of the program 110A, and performs the execution management process by executing the program 110A. In addition, the storage medium 103A has an information storage area 120A (hereinafter also referred to as a first storage unit 120A) which stores, e.g., information used when the execution management process is performed.

In addition, the physical machine 1B illustrated in FIG. 2 has a CPU (processor) 101B, a memory 102B, a storage medium 103B, and an external interface 104B (I/O unit 104B), similarly to the physical machine 1A. The individual units are connected to each other via a bus 106B. The storage medium 103B stores a program 110B. As illustrated in FIG. 2, the CPU 101B loads the program 110B to the memory 102B from the storage medium 103B at the time of the execution of the program 110B, and performs the execution management process by executing the program 110B. In addition, the storage medium 103B has, e.g., an information storage area 120B (hereinafter also referred to as a second storage unit 120B).

Further, the physical machine 1C illustrated in FIG. 2 has a CPU (processor) 101C, a memory 102C, a storage medium 103C, and an external interface 104C (I/O unit 104C), similarly to the physical machine 1A. The individual units are connected to each other via a bus 106C. The storage medium 103C stores a program 110C. As illustrated in FIG. 2, the CPU 101C loads the program 110C to the memory 102C from the storage medium 103C at the time of the execution of the program 110C, and performs the execution management process by executing the program 110C. In addition, the storage medium 103C has, e.g., an information storage area 120C (hereinafter also referred to as a third storage unit 120C).

Figure 3:
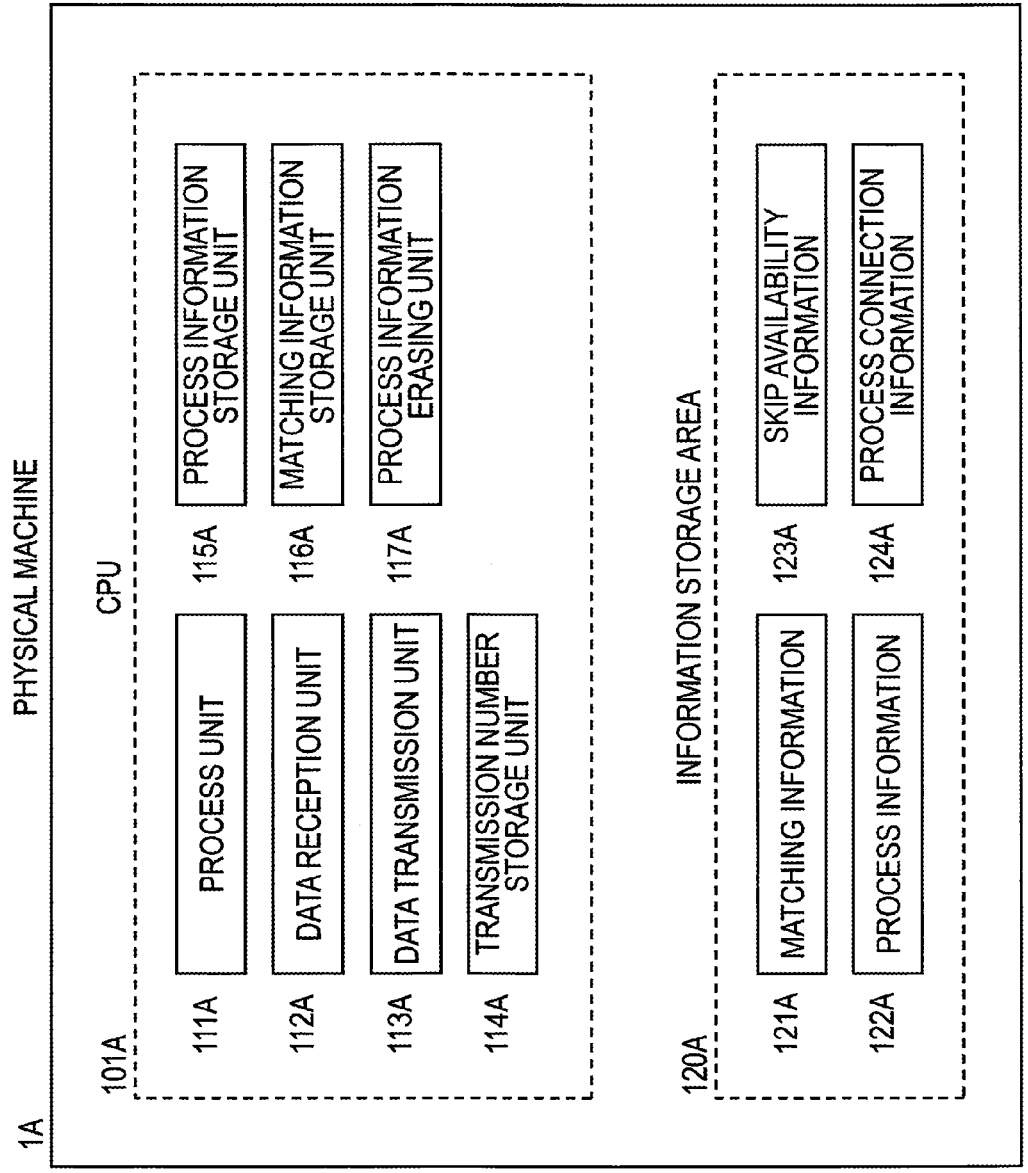
FIG. 3 is a functional block diagram of the physical machine illustrated in FIG. 2.

FIG. 3 is a functional block diagram of the physical machine illustrated in FIG. 2. In FIG. 3, the functional block diagram of the physical machine 1A is depicted. Note that the functional block diagram of each of the physical machine 1B and the physical machine 1C is the same as that of the physical machine 1A, and hence the functional block diagram thereof will be omitted. The CPU 101A operates as, e.g., a process unit 111A (hereinafter also referred to as a first process unit 111A), a data reception unit 112A, a data transmission unit 113A, a transmission number storage unit 114A, a process information storage unit 115A, a matching information storage unit 116A, and a process information erasing unit 117A by executing the program 110A. In the information storage area 120A, for example, matching information 121A, process information 122A, skip availability information 123A, and process connection information 124A are stored.

In addition, the CPU 101B operates as, e.g., a process unit 111B (hereinafter also referred to as a second process unit 111B), a data reception unit 112B, a data transmission unit 113B, a transmission number storage unit 114B, a process information storage unit 115B, a matching information storage unit 116B, and a process information erasing unit 117B by executing the program 110B. In the information storage area 120B, for example, matching information 121B, process information 122B, skip availability information 123B, and process connection information 124B are stored.

Further, the CPU 101C operates as, e.g., a process unit 111C (hereinafter also referred to as a third process unit 111C), a data reception unit 112C, a data transmission unit 113C, a transmission number storage unit 114C, a process information storage unit 115C, a matching information storage unit 116C, and a process information erasing unit 117C by executing the program 110C. In the information storage area 120C, for example, matching information 121C, process information 122C, skip availability information 123C, and process connection information 124C are stored.

Figure 4:
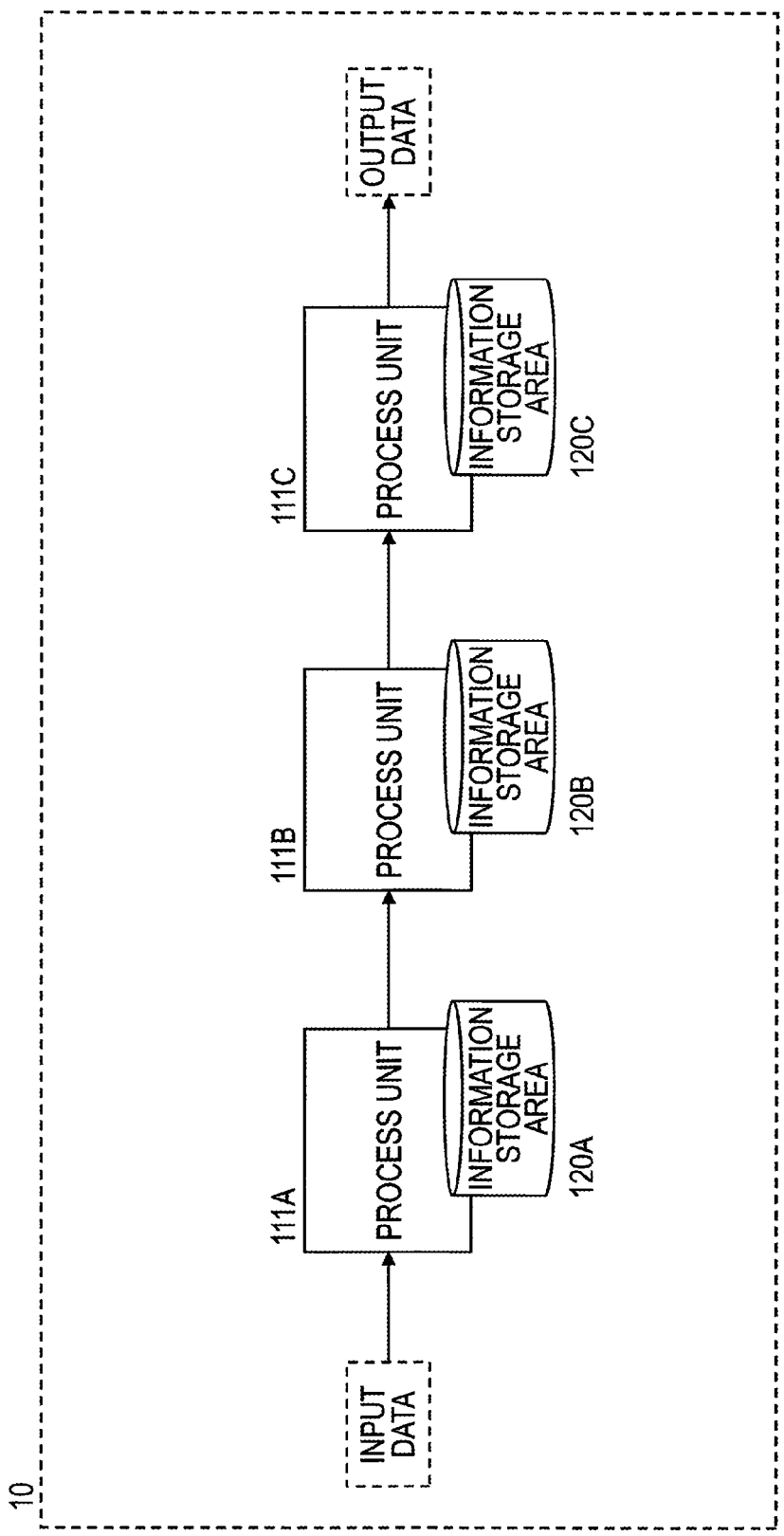
FIG. 4 is a view for explaining the case where a plurality of the process units cooperate with each other and perform process execution.
Figure 5:
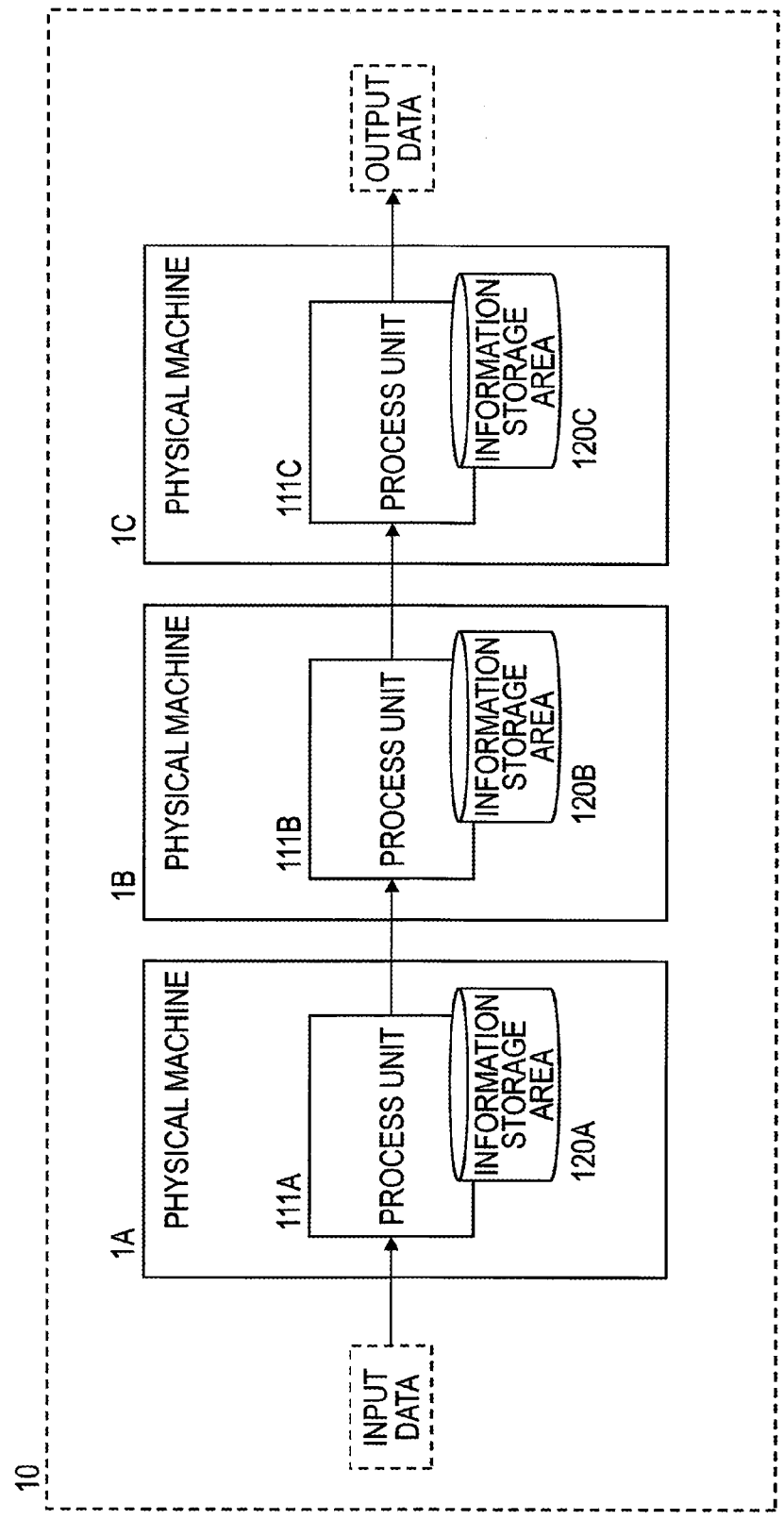
FIG. 5 is a view for explaining the case where a plurality of the process units cooperate with each other and perform process execution.

Each of FIGS. 4 and 5 is a view for explaining the case where a plurality of the process units cooperate with each other and perform process execution. Hereinafter, a description will be given of the process cooperation system 10 in which the process unit 111A performs a first process based on input data first, the process unit 111B performs a second process based on a first process result as the result of execution of the first process, and the process unit 111C performs a third process based on a second process result as the result of execution of the second process, as illustrated in FIGS. 4 and 5. Hereinafter, the function of the physical machine 1A will be described, and the description of the function of each of the physical machine 1B and the physical machine 1C will be omitted. Note that the process unit 111A in an example in each of FIGS. 4 and 5 performs the first process based on data inputted by, e.g., the business operator or the contractor, and the process unit 111C returns the process result obtained by executing the third process to the business operator or the contractor as output data.

As illustrated in FIG. 4, the process unit 111A executes the first process based on the input data from, e.g., the contractor. Subsequently, the process unit 111A stores the first process result as the result of execution of the first process in the information storage area 120A using the process information storage unit 115 described later. Further, the process unit 111A refers to the process connection information 124A which stores information indicative of a transmission destination of the process result by each process unit, and transmits the first process result to the second process unit 111B. Note that the process unit 111A transmits data such as the process result or the like using, e.g., the data transmission unit 113A described later.

Next, the process unit 111B executes the second process based on, e.g., the first process result from the process unit 111A. Subsequently, the process unit 111B stores the second process result as the result of execution of the second process in the information storage area 120B, and transmits the second process result to the third process unit 111C. In addition, the process unit 111B transmits an identifier of the process unit 111C to which the process unit 111B has transmitted the second process result and the second process result to the process unit 111A. Specifically, the process unit 111B refers to the skip availability information 123A which stores information indicative of whether or not the process of the process unit 111B is a process in which the output data is uniquely determined by the input data (hereinafter also referred to as a skippable process). In the case where the process of the process unit 111B is skippable, the process unit 111B may transmit the identifier of the process unit 111C and the second process result to the process unit 111A. The skip of the process unit will be described later.

Next, the process unit 111A having received the identifier and the second process result from the process unit 111B stores the received identifier and second process result in association with the first process result using the process information storage unit 115 described later. Subsequently, in the case where the process result of the first process executed in the process unit 111A thereafter matches the first process result previously stored by the process unit 111A, the second process result and the identifier stored in association with the first process result are extracted. Further, the process unit 111A transmits the extracted second process result to the process unit 111C identified by the extracted identifier.

The data reception unit 112A receives, e.g., the result of the process executed by another process unit or data inputted by the contractor or the like, and transfers it to the process unit 111A.

The data transmission unit 113A transmits, e.g., the process result of the first process by the process unit 111A to another process unit. In addition, the data transmission unit 113A transmits, e.g., the number of transmissions stored in the transmission number storage unit 114A to another process unit.

In the case where the process unit 111A does not transmit the process result to the process unit 111B but transmits the process result to the process unit 111C which is executed after the process unit 111B in, e.g., FIG. 4, the transmission number storage unit 114A stores the number of transmissions.

The process information storage unit 115A stores the first process result of the first process executed by the process unit 111A or the process resulted received from another process unit as the process information 122A based on an instruction from, e.g., the process unit 111A.

The matching information storage unit 116A stores the matching information 123A used, e.g., when the first process is performed in the process unit 111A. The matching information 123A will be described later. The process information erasing unit 117A erases, e.g., the process information 122A stored in the information storage area 120A.

[A Specific Example in the Case where the Individual Process Units Function in a Plurality of the Physical Machines]

FIG. 5 is a view illustrating the case where the process unit 111A, the process unit 111B, and the process unit 111C function in the physical machine 1A, the physical machine 1B, and the physical machine 1C which are different from each other. The process cooperation system 10 in an example in FIG. 5 needs to perform communication between the physical machines every time each process is executed.

Accordingly, for example, in the case where the process cooperation system 10 handles the process of a huge volume of data such as big data, an amount of communication and an amount of time of the communication needed to perform the process become huge amounts.

To cope with this, in the present embodiment, the second process result in the process unit 111B executed based on the first process result and the identifier of the process unit 111C executed based on the second process result are stored in association with the first process result in the process unit 111A. Subsequently, in the case where the process result in the process unit 111A executed thereafter matches the stored first process result, the process unit 111A transmits the second process result stored in association with the first process result to the process unit 111C to thereby suppress the process amount.

[First Embodiment]

Figure 6:
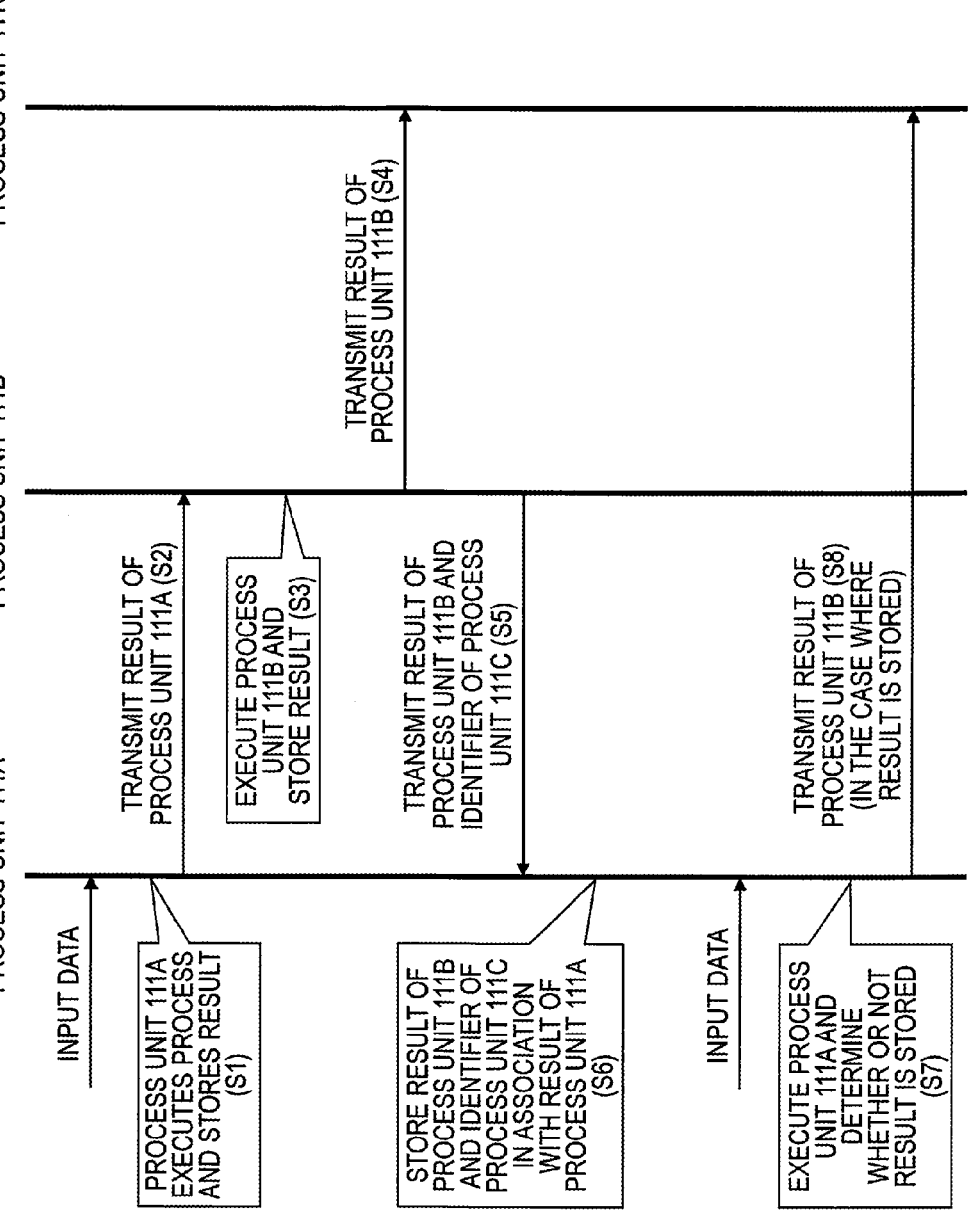
FIG. 6 is a sequence chart for explaining the summary of the execution management process in the first embodiment.

A first embodiment will be described first. FIG. 6 is a sequence chart for explaining the summary of the execution management process in the first embodiment. Each of FIGS. 7 to 11 is a view for explaining the summary of the execution management process in the first embodiment. The execution management process in FIG. 6 will be described with reference to FIGS. 7 to 11.

Figure 7:
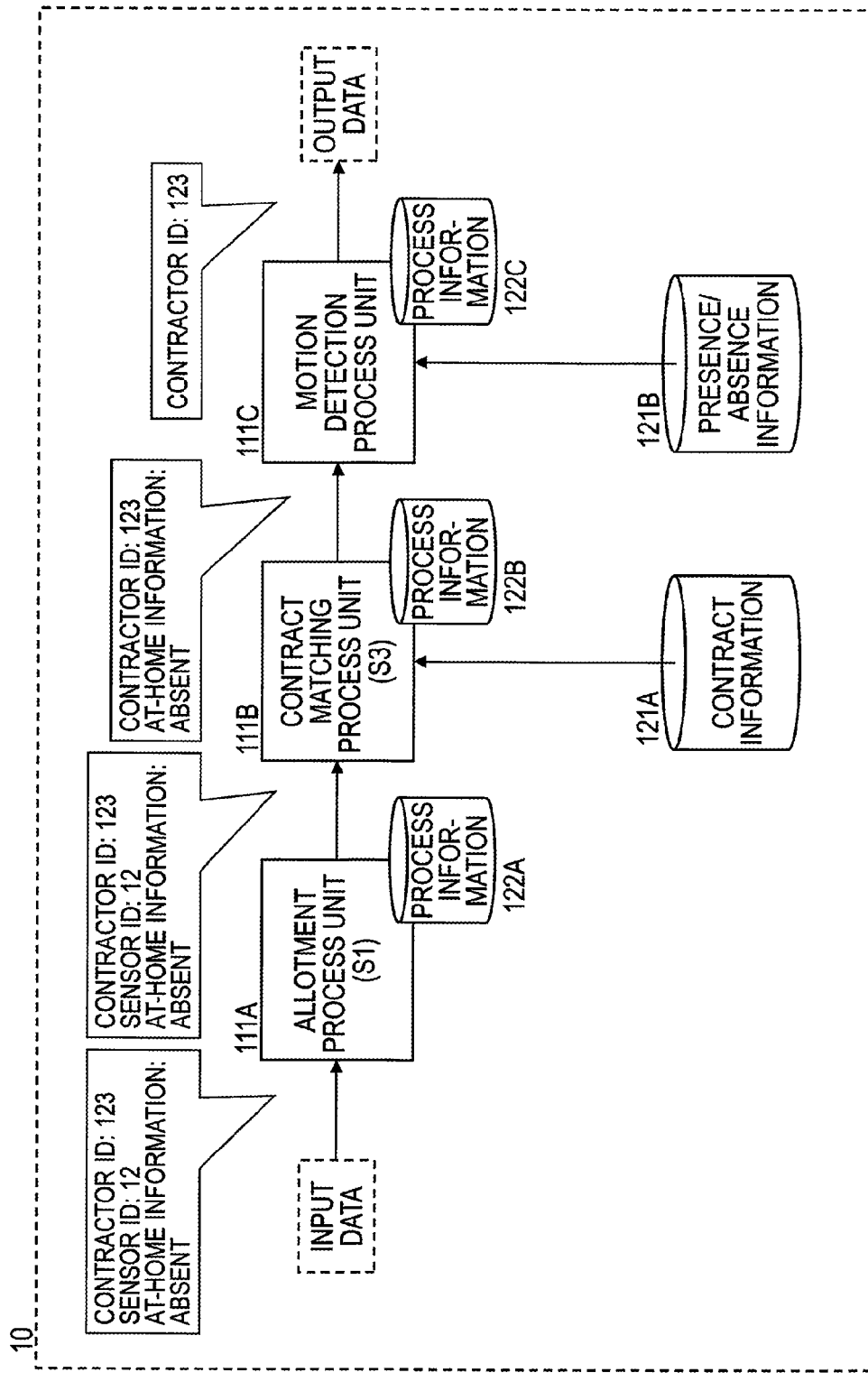
FIG. 7 is a view for explaining the summary of the execution management process in the first embodiment.

[The Configuration of the Process Cooperation System in FIG. 7]

First, the configuration of the process cooperation system 10 in an example in FIG. 7 will be described. The process cooperation system 10 in FIG. 7 acquires presence/absence information of a person in the house of the contractor. That is, in the case where the presence of the person in the house of the contractor is detected when the contractor is out (a situation in which nobody is at home), the process cooperation system 10 determines that, e.g., there is a possibility that a suspicious person has intruded into the house of the contractor. In this case, the process cooperation system 10 contacts, e.g., a contract security company.

In FIG. 7, the process cooperation system 10 has an allotment process unit 111A (the process unit 111A), a contract matching process unit 111B (the process unit 111B), and a motion detection unit 111C (the process unit 111C). The allotment process unit 111A allots the input data to a subsequent process unit in which the input data is to be processed based on, e.g., the content of the input data. From the viewpoint of load distribution of the process cooperation system 10, the allotment process unit 111A may determine the subsequent process unit based on a contractor ID of the input data. The contract matching process unit 111B performs a process based on, e.g., the result of the process in the allotment process unit 111A and contract information 121A, and transmits the process result to the subsequent process unit in which the process result is to be processed. The motion detection process unit 111C performs a process based on, e.g., the result of the process in the contract matching process unit 111B and presence/absence information 121B, and transmits the process result to the subsequent process unit in which the process result is to be processed. Note that, in the example in FIG. 7, a description will be given on the assumption that the subsequent process unit of the allotment process unit 111A is only the contract matching process unit 111B, and the subsequent process unit of the contract matching process unit 111B is only the motion detection process unit 111C.

Each of FIGS. 8A and 8B is a view for explaining the contents of the contract information 121A and the presence/absence information 121B. As illustrated in FIG. 8A, the items of the contract information 121A include, e.g., a contractor ID, a sensor ID, and a sensor name. An example in FIG. 8A indicates that the contractor having the contractor ID "123" has a contract for "ROOM TEMPERATURE SENSOR" having the sensor ID "3" and "MOTION SENSOR" having the sensor ID "12". The example therein further indicates that the contractor having the contractor ID "124" has a contract for "ROOM TEMPERATURE SENSOR" having the sensor ID "3" and "HUMIDITY SENSOR" having the sensor ID "17". The example therein also indicates that the contractor having the contractor ID "125" has a contract for "ROOM TEMPERATURE SENSOR" having the sensor ID "3". In an example in FIG. 8B, the presence/absence information 121B indicates that the contractor having the contractor ID "123" is "ABSENT", and the contractors having the contractor IDs "124" and "125" are "PRESENT (at home)". The sensor ID and the sensor name stored in the contract information 121A may also be the sensor ID and the sensor name which are stored in the contract information 121A by the matching information storage unit 116A of the process cooperation system 10 at the time of contract by the contractor. In addition, with regard to the presence/absence situation of the presence/absence information 121B, the matching information storage unit 116A of the process cooperation system 10 may acquire positional information of the contractor from the cellular phone of the contractor, determine whether the contractor is present or absent, and store (update) the presence/absence information 121B.

[The Flow of a Conventional Process in the Process Cooperation System]

Next, the flow of a conventional process in the process cooperation system 10 in FIG. 7 will be described. In an example in FIG. 7, the allotment process unit 111A receives the input data having the contractor ID "123", the sensor ID "12", and at-home information indicative of "ABSENT" first. Subsequently, the allotment process unit 111A checks, e.g., the contractor ID of the input data, and transmits the process result to the contract matching process unit 111B in which the data on the contractor having the contractor ID "123" is to be processed. Note that, in the example in FIG. 7, the allotment process unit 111A transmits the received input data to the contract matching process unit 111B without alteration as the process result (the output data).

The contract matching process unit 111B having received the process result (the output data) of the allotment process unit 111A performs matching between the sensor ID of the received data and the contract information 121A in the example in FIG. 7. Specifically, the sensor ID in the received data is "12". Further, in the contract information 121A, the contractor having the contractor ID "123" has a contract for "MOTION SENSOR" having the sensor ID "12". Accordingly, the contract matching process unit 111B transmits the process result to the motion detection process unit 111C. Specifically, for example, the contract matching process unit 111B transmits the process result having information that includes the contractor ID "123" and the at-home information indicative of "ABSENT" to the motion detection process unit 111C. Note that, in the case where the information on the sensor ID received by the contract matching process unit 111B is not present in the contract information 121A, the contract matching process unit 111B may determine that the input data is invalid. In this case, the contract matching process unit 111B may return an error to the business operator or the contractor who has inputted the input data.

Further, the motion detection process unit 111C having received the process result of the contract matching process unit 111B performs the matching between the at-home information in the received data and the presence/absence information 121B. Specifically, the at-home information in the received data is "ABSENT". Further, in the presence/absence information 121B, the contractor having the contractor ID "123" has the presence/absence situation indicative of "ABSENT". Accordingly, the motion detection process unit 111C transmits the process result (the output data) which includes, e.g., information indicative of "NORMAL" to the business operator or the contractor who has inputted the input data.

Note that, in the example in FIG. 7, for example, the process cooperation system 10 may execute the process when the input data is inputted by the business operator or the contractor, and transmit the process result to the business operator or the contractor. In addition, in the example in FIG. 7, for example, the process cooperation system 10 may automatically input data having a predetermined content, and periodically transmit the process result to the contractor.

[S1 to S6 in FIG. 6]

Next, the summary of the execution management process (the execution management process in the present embodiment) in FIG. 6 will be described with reference to the process cooperation system 10 in FIG. 7. Note that, in the example in FIG. 6, in the process in the contract matching process unit 111B (the process unit 111B), it is assumed that the output data from the contract matching process unit 111B is uniquely determined by the input data to the contract matching process unit 111B as long as the content stored in the contract information 121A is not changed (the contract matching process unit 111B is skippable).

Figure 9:
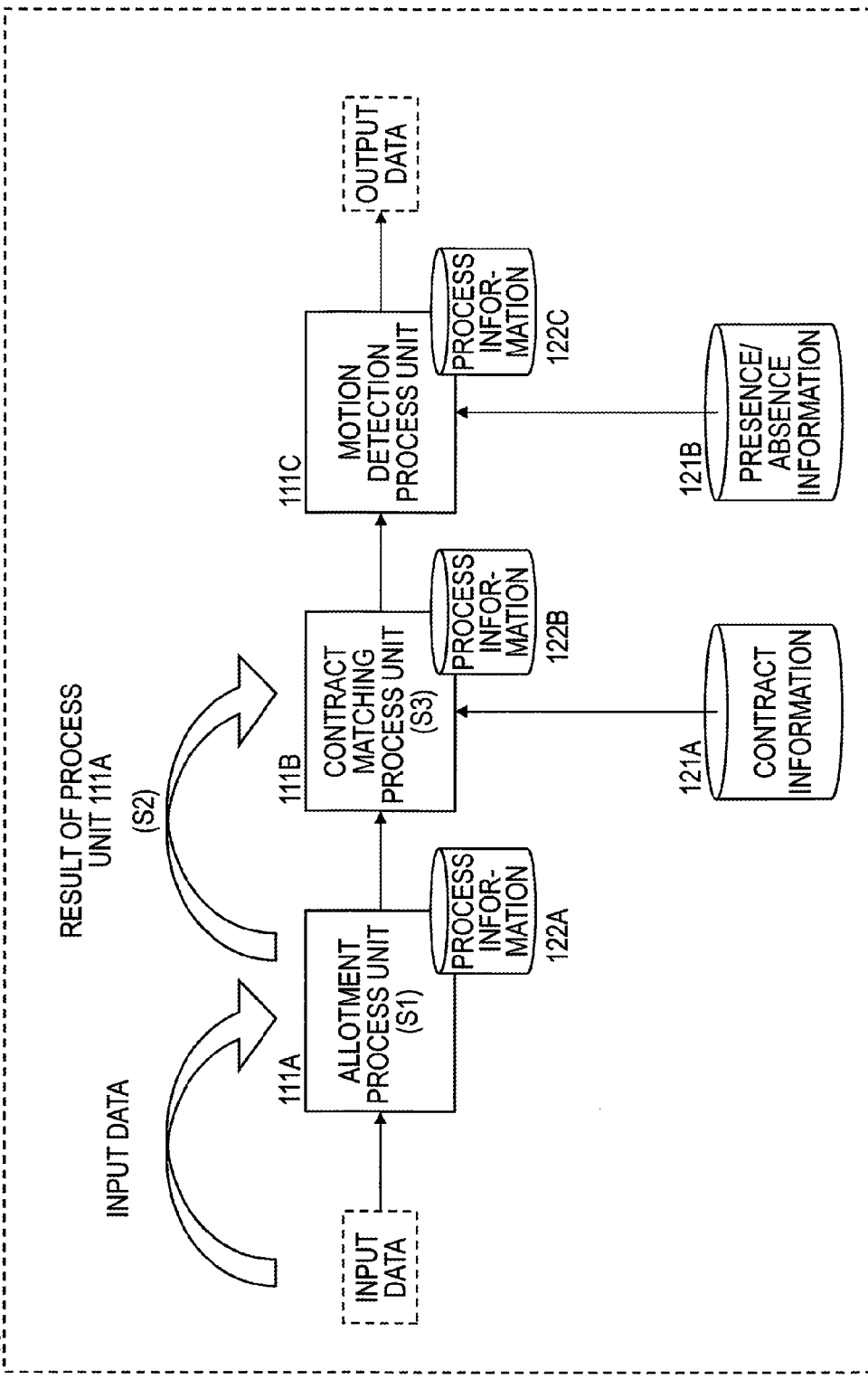
FIG. 9 is a view for explaining the summary of the execution management process in the first embodiment.

As illustrated in FIG. 9, first, the allotment process unit 111A (the process unit 111A) executes the process based on the input data, and stores the process result (the first process result) in the information storage area 120A as the process information 122A (S1). Subsequently, the allotment process unit 111A transmits the process result of the allotment process unit 111A to the contract matching process unit 111B (S2).

Figure 10:
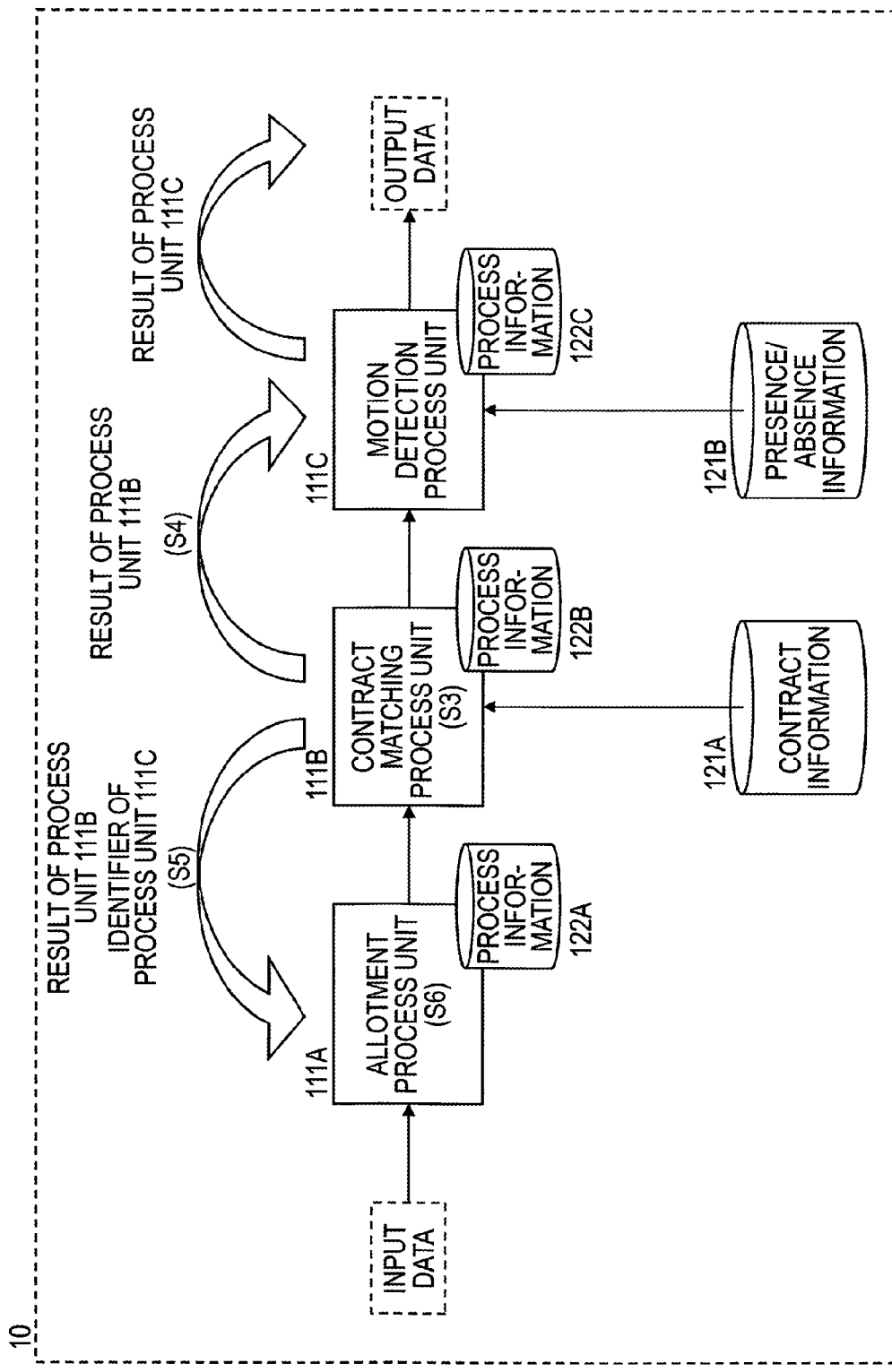
FIG. 10 is a view for explaining the summary of the execution management process in the first embodiment.

Next, as illustrated in FIG. 10, the contract matching process unit 111B executes the process based on the process result of the allotment process unit 111A, and stores the process result (the second process result) in the information storage area 120B as the process information 122B (S3). Subsequently, the contract matching process unit 111B transmits the process result of the contract matching process unit 111B to the motion detection process unit 111C (the process unit 111C) (S4). Further, the contract matching process unit 111B transmits the identifier which identifies the motion detection process unit 111C as the process unit to which the contract matching process unit 111B has transmitted the process result and the process result of the contract matching process unit 111B (hereinafter also referred to as skip determination information) to the allotment process unit 111A (S5). Then, the allotment process unit 111A having received the identifier and the process result of the contract matching process unit 111B from the contract matching process unit 111B stores the received identifier and process result in the information storage area 120A in association with the process result of the allotment process unit 111A stored in the information storage area 120A by the allotment process unit 111A (S6). In addition, as illustrated in FIG. 10, the motion detection process unit 111C executes the process based on the process result of the contract matching process unit 111B. Subsequently, in an example in FIG. 10, the motion detection process unit 111C transmits the process result (the third process result) to the contractor or the like who has inputted the input data as the output data.

That is, the allotment process unit 111A stores the process result of the process of the allotment process unit 111A, whereby it is possible to store the received information in association with the process result of the allotment process unit 111A when the allotment process unit 111A receives the process result of the contract matching process unit 111B and the identifier which identifies the motion detection process unit 111C.

Note that, in S2 or S4, each process unit may transmit the identifier for identifying the process unit to the next process unit together with the result of the process executed in the process unit.

[S7 and S8 in FIG. 6]

Figure 11:
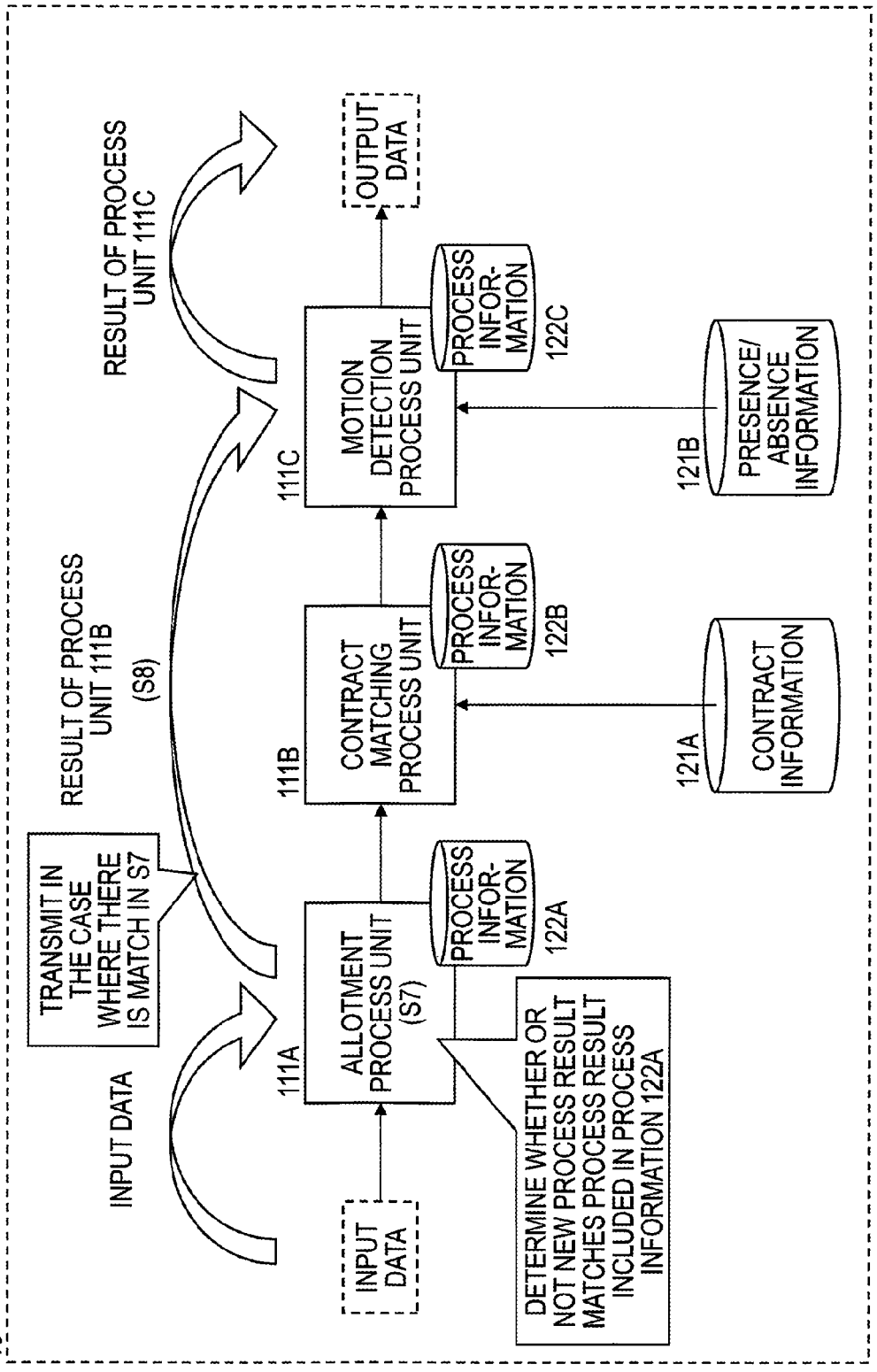
FIG. 11 is a view for explaining the summary of the execution management process in the first embodiment.

After S6 described above, in the case where the allotment process unit 111A has executed the process based on the newly received input data, as illustrated in FIG. 11, the allotment process unit 111A determines whether or not the process result matches the process result included in the process information 122A stored in the information storage area 120A (S7). Subsequently, in the case where the matching process result is stored, the allotment process unit 111A transmits the process result of the process unit stored in association with the stored process result (the contract matching process unit 111B in the example in FIG. 6) to the process unit identified by the identifier stored in association with the stored process result (the motion detection process unit 111C in the example in FIG. 6) (S8).

That is, in the example in FIG. 6, in the process in the contract matching process unit 111B, the output data is uniquely determined by the input data, and hence it follows that the output data of the process in the contract matching process unit 111B is determined uniquely when the process result of the allotment process unit 111A is determined. In the example in FIG. 6, the allotment process unit 111A stores information items on the input data and the output data (the process result) of the contract matching process unit 111B, and the transmission destination (the identifier) of the output data in association with each other. Accordingly, the allotment process unit 111A transmits the output data of the contract matching process unit 111B to the motion detection process unit 111C as the transmission destination of the output data of the contract matching process unit 111B, whereby it becomes possible to omit (skip) the process in the contract matching process unit 111B while maintaining integrity of the data processed in the process cooperation system 10.

Thus, according to the first embodiment, the process unit 111A stores the first process result as the result of execution of the first process as the process of the process unit 111A in the first storage unit 120A, and transmits the first process result to the process unit 111B. Next, the process unit 111B stores the second process result as the result of execution of the second process of the process unit 111B based on the first process result received from the process unit 111A in the second storage unit 120B, and transmits the second process result to the process unit 111C. Subsequently, the process unit 111B transmits the second process result and the identifier which identifies the process unit 111C to the process unit 111A. Then, the process unit 111A stores the second process result and the identifier which identifies the process unit 111C which are received from the process unit 111B in association with the first process result in the first storage unit 120A. Further, in the case where the process result of the first process executed thereafter matches the process result stored in the first storage unit 120A, the process unit 111A extracts the second process result and the identifier stored in association with the first process result, and transmits the second process result to the process unit 111C identified by the extracted identifier. With this, it becomes possible to omit the process needed to acquire the output data. Accordingly, it becomes possible to reduce the communication between the physical machines needed to acquire the output data in the case where the individual process units function over the plurality of the physical machines.

[A Method for Determining Whether or not the Process in Each Process Unit is Skippable]

The business operator (a developer of the process cooperation system 10) determines whether or not the process unit is skippable based on the feature of a program which implements the function of each process unit. Specifically, for example, the business operator analyzes the operation in the program at the time of the development of the program which implements each process unit (e.g., at the time of compiling). Subsequently, in the case where it is determined that the output data is uniquely determined by the input data in the function implemented by the program, the business operator may determine that the process in the process unit is skippable and pre-store the process in the process unit in the skip availability information 123A. In addition, the business operator may extract the process in which the output data is uniquely determined by the input data based on the operation situation after the start of the operation of the process cooperation system 10, and determine (change) the skippable process unit based on the extracted process.

Further, in the case where services are not affected, the business operator may determine that the process in which the same output data is highly likely to be outputted from the same input data (the process in which the output data is not uniquely determined by the input data) is the skippable process. In addition, the business operator may determine that the process unit which bears the role of another function such as the process unit which functions as the reception unit for receiving the input data or the like is the process unit which is not skippable irrespective of the feature of the program which implements each function.

[Details of the First Embodiment]

Figure 12:
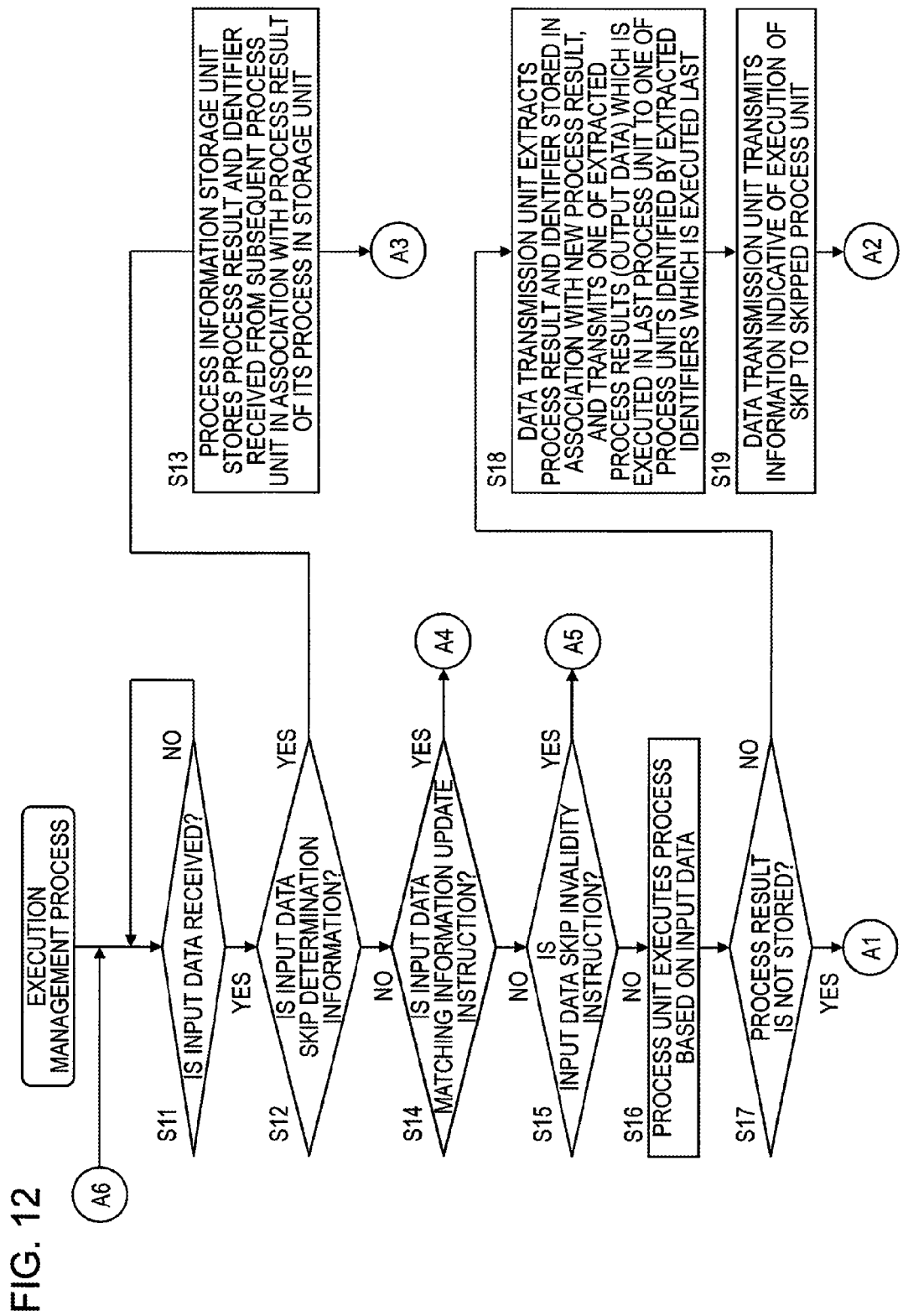
FIG. 12 is a flow chart for explaining the details of the execution management process in the first embodiment.
Figure 13:
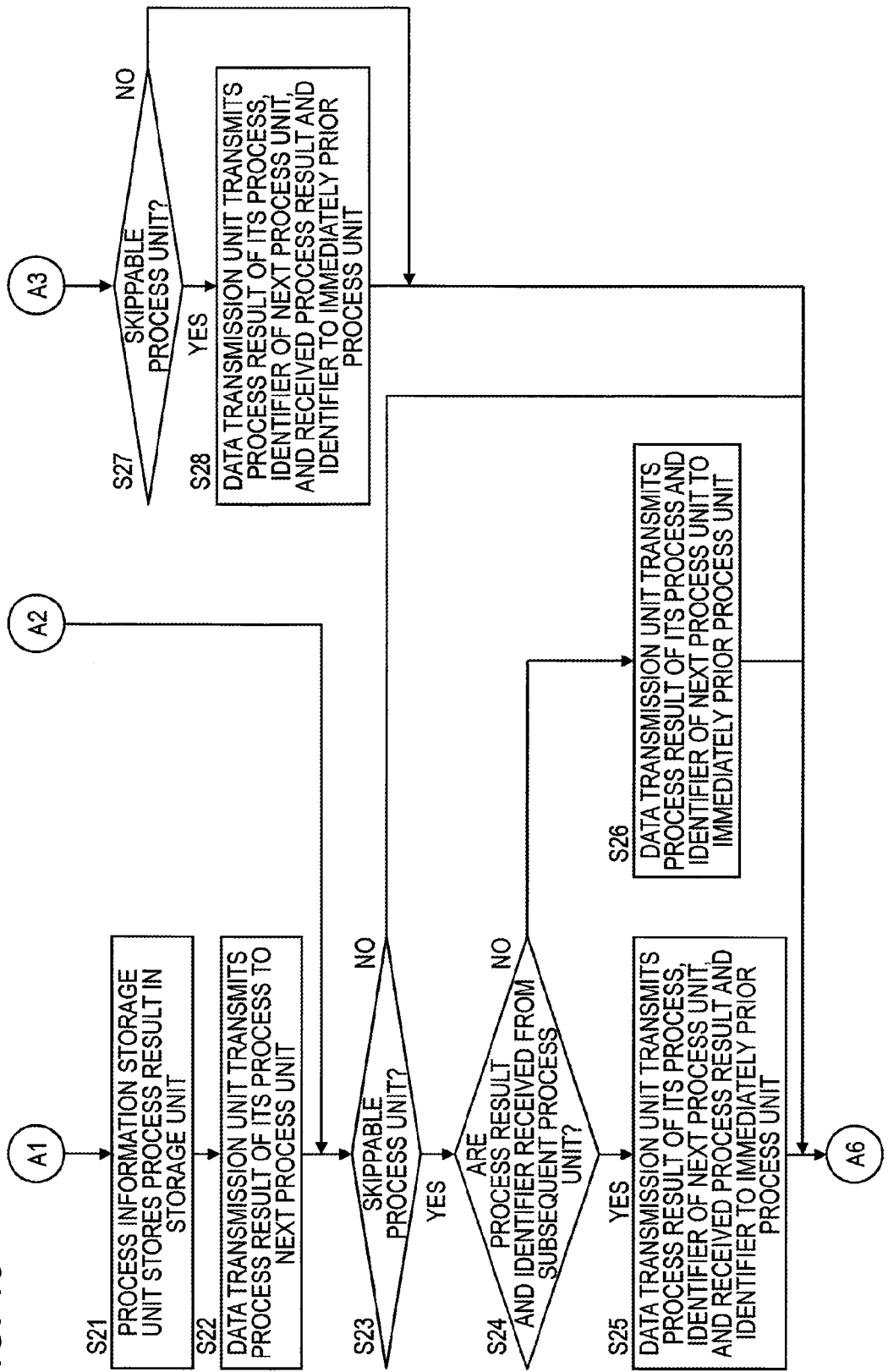
FIG. 13 is a flow chart for explaining the details of the execution management process in the first embodiment.
Figure 14:
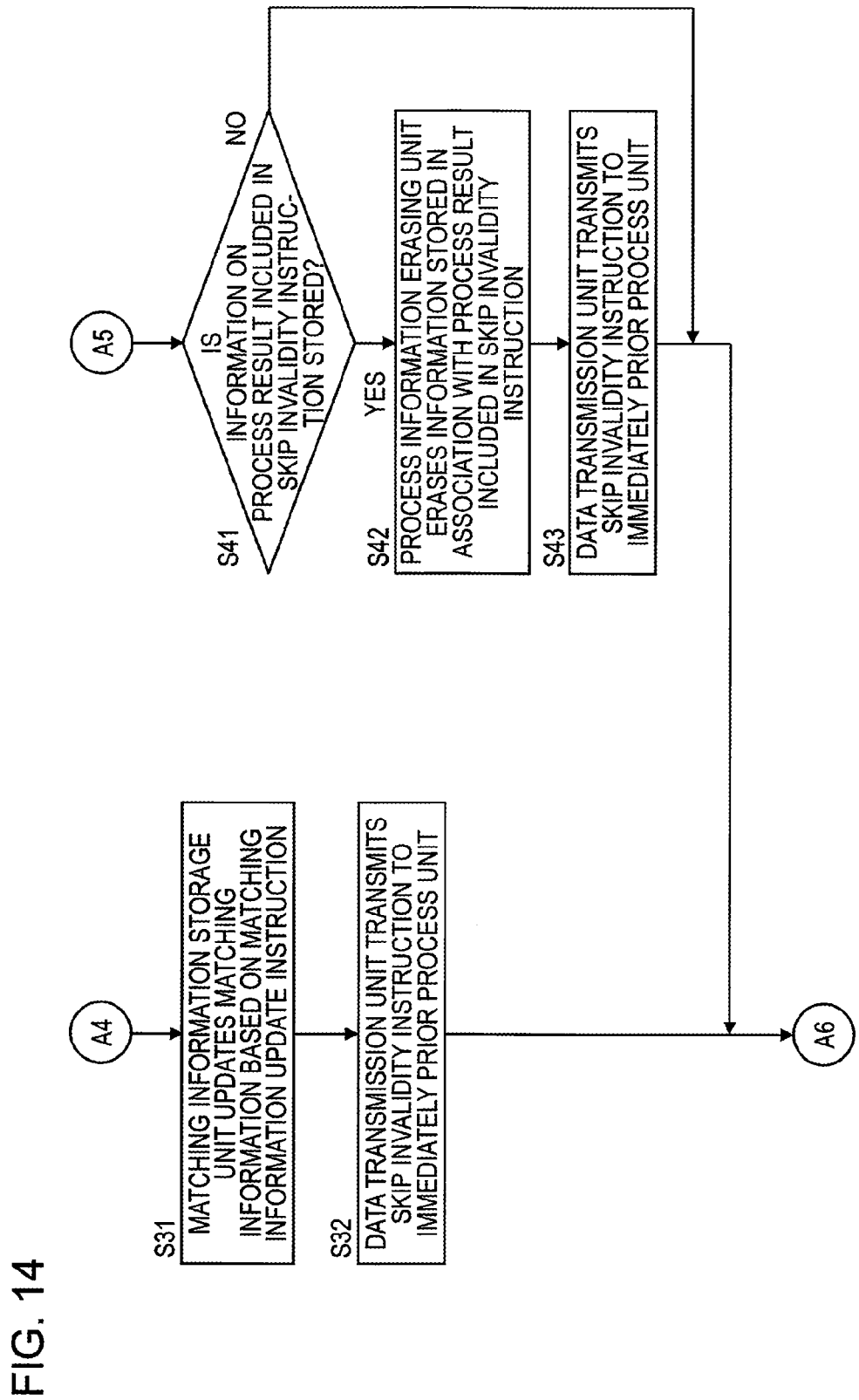
FIG. 14 is a flow chart for explaining the details of the execution management process in the first embodiment.
Figure 15:
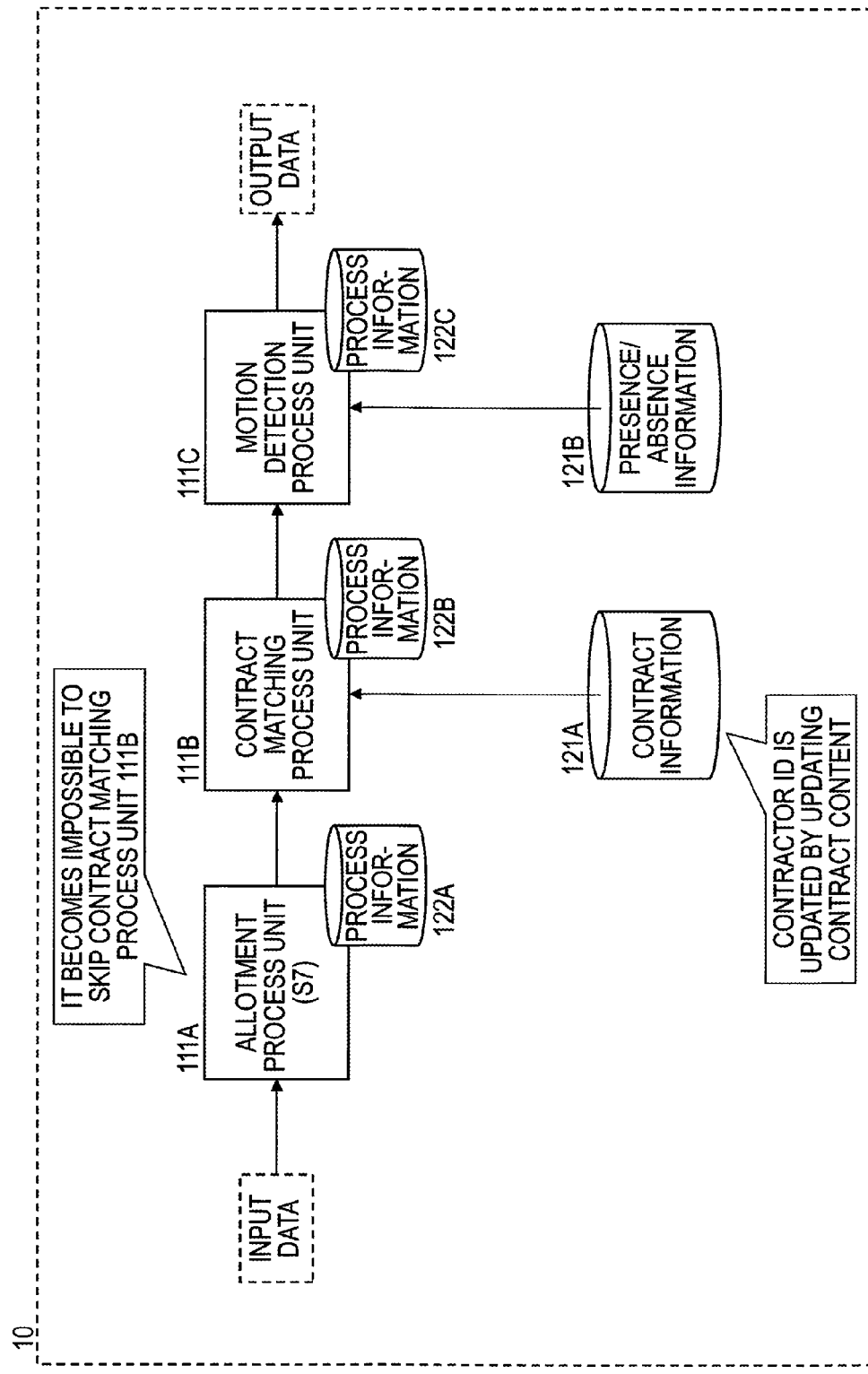
FIG. 15 is a view for explaining a skip invalidity instruction in the execution management process in the first embodiment.

Next, the details of the first embodiment will be described. Each of FIGS. 12 to 14 is a flow chart for explaining the details of the execution management process in the first embodiment. In addition, FIG. 15 is a view for explaining a skip invalidity instruction in the execution management process in the first embodiment. The details of the execution management process in FIGS. 12 to 14 will be described with reference to FIGS. 9 to 11 and FIG. 15.

[A Process in the Case where the Process Result which is not Stored has been Received from the Prior Process Unit (1)]

First, a process in the case where the process unit which is not skippable has received the process result of the process unit which has been previously executed will be described. Specifically, in an example in FIG. 9, the case where the allotment process unit 111A has received the input data (the input data which is not stored in the information storage area 120A) will be described. Note that, hereinafter, it is assumed that the allotment process unit 111A is the skippable process unit, each of the contract matching process unit 111B and the motion detection process unit 111C is the process unit which is not skippable, and these information items are pre-stored in the skip availability information 123A.

First, in the case where the data reception unit 112A has received the input data inputted by the contractor or the like (YES in S11, NO in S12, NO in S14, NO in S15), the allotment process unit 111A executes the process (the first process) based on, e.g., the input data (S16). Next, the allotment process unit 111A checks, e.g., the process information 122A of the information storage area 120A, and determines whether or not the information (the previous process result) which matches the new process result is stored (S17). Subsequently, in the case where the process result which matches the new process result is not stored (YES in S17), the process information storage unit 115A stores the new process result in the information storage area 120A as the process information 122A based on, e.g., the instruction from the allotment process unit 111A (S21). Further, the data transmission unit 113A transmits the process result of the allotment process unit 111A to the next (immediately subsequent) process unit based on, e.g., the instruction from the allotment process unit 111A (S22). Note that the data transmission unit 113A may determine the transmission destination of the allotment process unit 111A by referring to the process connection information 124A.

Next, the allotment process unit 111A refers to, e.g., the skip availability information 123A, and determines whether or not the allotment process unit 111A is the skippable process unit (S23). The allotment process unit 111A in an example in FIG. 10 is not the skippable process unit, and hence the allotment process unit 111A waits until the data reception unit 112A receives the next input data (NO in S23, S11).

[A Process in the Case where the Process Result which is not Stored has been Received from the Prior Process Unit (2)]

Next, a process in the case where the skippable process unit has received the process result of the process unit which has been executed previously will be described. Specifically, in the example in FIG. 9, the case where the contract matching process unit 111B has received the input data (the process result of the allotment process unit 111A) will be described.

First, in the case where the data reception unit 112B has received the input data (the process result of the allotment process unit 111A) (YES in S11, NO in S12, NO in S14, NO in S15), the contract matching process unit 111B executes its process based on, e.g., the received input data (S16). Next, the contract matching process unit 111B checks, e.g., the process information 122B of the information storage area 120B, and determines whether or not the information (the previous process result) which matches the new process result is stored (S17). Subsequently, in the case where the process result that matches the new process result is not stored (YES in S17), the process information storage unit 115b stores the new process result in the information storage area 120B based on, e.g., the instruction from the contract matching process unit 111B (S21). Further, the data transmission unit 113B transmits the process result of the process of the contract matching process unit 111B to the next (immediately subsequent) process unit based on, e.g., the instruction from the contract matching process unit 111B (S22).

Next, the contract matching process unit 111B refers to, e.g., the skip availability information 123B, and determines whether or not the contract matching process unit 111B is the skippable process unit (S23). The contract matching process unit 111B in FIG. 9 is the skippable process unit (YES in S23), and hence the contract matching process unit 111B determines whether or not the process result and the identifier are received from the process unit executed later (S24). Specifically, the contract matching process unit 111B refers to, e.g., the process information 122B of the information storage area 120B, and makes the determination. Subsequently, in the case where the process result and the identifier are received from the process unit executed later (YES in S24), the data transmission unit 113B transmits the process result of the contract matching process unit 111B, the identifier of the next (immediately subsequent) process unit, and the received process result and identifier to the immediately prior process unit as skip determination information based on, e.g., the instruction from the contract matching process unit 111B (S25). On the other hand, in the case where the process result and the identifier are not received from the process unit executed later (NO in S24), the data transmission unit 1136 transmits the process result of the contract matching process unit 111B and the identifier of the next (immediately subsequent) process unit (the motion detection process unit 111C) to the immediately prior process unit as the skip determination information (S26). Note that, in the case the process unit is the first process unit in the process cooperation system 10, the skip determination information is not transmitted to the process unit executed previously. In addition, in the case where the process unit is the last process unit in the process cooperation system 10, the process result of the process unit is not transmitted to the process unit executed later.

That is, the data transmission unit of each process unit transmits the skip determination information to the immediately prior process unit in the case where the process unit is skippable.

Note that the data transmission unit 113B stores, e.g., the number of receptions of the process result from the allotment process unit 111A by the data reception unit 112B (hereinafter also referred to as a reception number). Subsequently, in the case where the reception number exceeds a predetermined threshold value (e.g., 10 times), the data transmission unit 113B may transmit the skip determination information of the contract matching process unit 111B to the allotment process unit 111A.

[A Process in the Case where the Process Result has been Received from the Subsequent Process Unit]

Next, a process in the case where the process result of the process unit executed later has been received will be described. Specifically, in the example in FIG. 10, the case where the contract matching process unit 111B has received the skip determination information from the motion detection process unit 111C will be described. Note that, in the process cooperation system 10 in the example in FIG. 10, it is assumed that an output process unit (not illustrated) which returns the output data of the process cooperation system 10 is present after the motion detection process unit 111C. In addition, it is assumed that the skip determination information received from the motion detection process unit 111C by the contract matching process unit 111B includes, e.g., the process result of the motion detection process unit 111C and the identifier indicative of the output process unit.

First, in the case where the data reception unit 112B has received the skip determination information from the motion detection process unit 111C (YES in S11, YES in S12), the process information storage unit 115B stores the received skip determination information in the information storage area 120B in association with the process result related to the skip determination information (the process result stored in the information storage area 120B) (S13). Specifically, in the example in FIG. 10, the process result of the contract matching process unit 111B as the input data to the motion detection process unit 111C, the process result of the process in the motion detection process unit 111C executed based on the process result of the contract matching process unit 111B, and the identifier indicative of the output process unit as the transmission destination of the process result of the motion detection process unit 111C (the output data of the process cooperation system 10) are stored in association with each other.

Next, the contract matching process unit 111B determines whether or not the contract matching process unit 111B is the skippable process unit (S27). Subsequently, in the case where the contract matching process unit 111B is the skippable process unit (YES in S27), the data transmission unit 113B transmits the process result of the contract matching process unit 111B, the identifier indicative of the motion detection process unit 111C as the next (immediately subsequent) process unit, and the received process result and identifier to the immediately prior process unit (S28). With this, in the case where a plurality of the skippable process units are successively present, it is possible to cause each process unit to store the information needed to skip all of these process units by executing the process only once.

Note that the data transmission unit 113B may transmit the process result of the contract matching process unit 111B, the identifier indicative of the motion detection process unit 111C as the next (immediately subsequent) process unit, and the received process result and identifier to the immediately prior process unit only in, e.g., one of S25 and S28 in FIG. 13. With this, it is possible to prevent repeated transmission of the same skip determination information to the prior process unit. In addition, the data reception unit 112A which receives the skip determination information from the data transmission unit 113B may abandon the received data in the case where the data reception unit 112A has received the duplicate skip determination information.

[A Process in the Case where the Stored Process Result has been Received from the Prior Process Unit]

Next, a process in the case where the process result of the process unit executed previously has been received and the process result has been stored in the information storage area will be described. Specifically, in an example in FIG. 11, the case where the allotment process unit 111A has received the input data (the input data stored in the information storage area 120A) will be described.

First, in the case where the data reception unit 112A has received the input data inputted by the contractor or the like (YES in S11, NO in S12, NO in S14, NO in S15), the allotment process unit 111A executes its process based on, e.g., the input data (S16). Next, the allotment process unit 111A checks the process information 122A of the information storage area 120A, and determines whether or not the information (the previous process result) which matches the new process result is stored (S17). Subsequently, in the case where the process result which matches the new process result is stored (NO in S17), the data transmission unit 113A extracts the process result of the contract matching process unit 111B and the identifier which are stored in association with the process result which matches the new process result based on, e.g., the instruction from the allotment process unit 111A. Further, the data transmission unit 113A transmits the extracted process result of the contract matching process unit 111B to, e.g., the process unit (the motion detection process unit 111C) identified by the extracted identifier (S18). Specifically, the allotment process unit 111A receives the process result of the contract matching process unit 111B and the identifier of the motion detection process unit 111C in FIG. 10, and stores these information items in the information storage area 120A in association with the process result of the allotment process unit 111A. Accordingly, the allotment process unit 111A extracts the process result of the contract matching process unit 111B and the identifier of the motion detection process unit 111C from the information storage area 120A, and transmits the process result of the contract matching process unit 111B to the motion detection process unit 111C. Note that, in the case where a plurality of different process results and identifiers are stored in association with the process result which matches the new process result, the allotment process unit 111A transmits one of the extracted process results which is executed in the last process unit to one of the process units identified by the stored identifiers which is executed last.

In addition, the data transmission unit 113A may notify the skipped process unit that the process unit is skipped, e.g., after S18 (S19). In this case, the transmission number storage unit 114A stores the number of skips of the subsequent process unit on a per process unit basis. Then, in the case where the number of skips thereof exceeds a predetermined threshold value (e.g., 10 times), the data transmission unit 113A may transmit the number of skips thereof.

[A Process in the Case where a Matching Information Update Instruction has been Received]

Next, a process in the case where the process unit has received the update instruction of the matching information will be described. Specifically, in the example in FIG. 11, the case where the contract matching process unit 111B has received the update instruction of the contract information 121A will be described.

First, in the case where the data reception unit 112B has received the matching information update instruction from the previously executed process unit (e.g., the process unit other than the allotment process unit 111A) (YES in S11, NO in S12, YES in S14), the matching information storage unit 116B updates the matching information 121A (the contract information 121A in the example in FIG. 11) based on the matching information update instruction (S31). The matching information update instruction is used for updating (erasing) the contract information 121A illustrated in FIG. 8A, e.g., in the case where the contractor having the contractor ID "123" dissolves the contract for performing the monitoring using the motion sensor having the sensor ID "12".

Herein, there are cases where the output data of the contract matching process unit 111B is changed with the update of the contract information 121A resulting from the reception of the matching information update instruction. Specifically, in the case where the contract information 121A is in the state illustrated in FIGS. 8A and 8B, as illustrated in FIG. 7, when the input data having the contractor ID "123", the sensor ID "12", and the at-home information indicative of "ABSENT" has been received, the contract matching process unit 111B transmits the output data having the contractor ID "123" and the at-home information indicative of "ABSENT" to the motion detection process unit 111C. In contrast to this, for example, after the update of the contract information 121A by the matching information update instruction, the information on the motion sensor of the contractor having the contractor ID "123" is not stored in the contract information 121A. Accordingly, it follows that the contract matching process unit 111B returns an error in the case where the contract matching process unit 111B has received the above input data.

That is, since the skip is performed on the assumption that the output data is uniquely determined by the input data, in the case where the change (update) of the contract information 121A has occurred, as illustrated in FIG. 15, it is not proper to perform the skip of the contract matching process unit 111B from the viewpoint of securing the integrity of the data. Consequently, the contract matching process unit 111B needs to notify the prior process unit of the erasing of the information on the contract matching process unit 111B in each process unit in the case where there is a possibility that the new process result of the contract matching process unit 111B is different from the previous process result thereof.

Returning to FIG. 14, the data transmission unit 113B transmits an instruction for the erasing of the information on the skip (hereinafter also referred to as the skip invalidity instruction) to the immediately prior process unit (the allotment process unit 111A in the example in FIG. 11) (S32).

Thereafter, the allotment process unit 111A having received the skip invalidity instruction from the contract matching process unit 111B determines whether or not the information on the process result included in the received skip invalidity instruction is stored (S41). Subsequently, in the case where the information on the process result included in the skip invalidity instruction is stored (YES in S41), the process information erasing unit 117A of the allotment process unit 111A erases the information on the process result included in the skip invalidity instruction (S42). Next, the data transmission unit 113A transmits the skip invalidity instruction received from the contract matching process unit 111B to the immediately prior process unit (S43). That is, in the case where the change (update) of the contract information 121A is performed, the information on the skip of the process unit which is influenced by the change is erased. With this, it becomes possible to secure the integrity of the entire processes of the process cooperation system 10. In addition, after the erasing of the information on the skip of the contract matching process unit 111B, each process unit of the process cooperation system 10 becomes capable of newly storing the information for skipping the contract matching process unit 111B based on the combination of the input data and the new output data of the contract matching process unit 111B.

[A Specific Example of the Execution Management Process in the First Embodiment]

Figure 16:
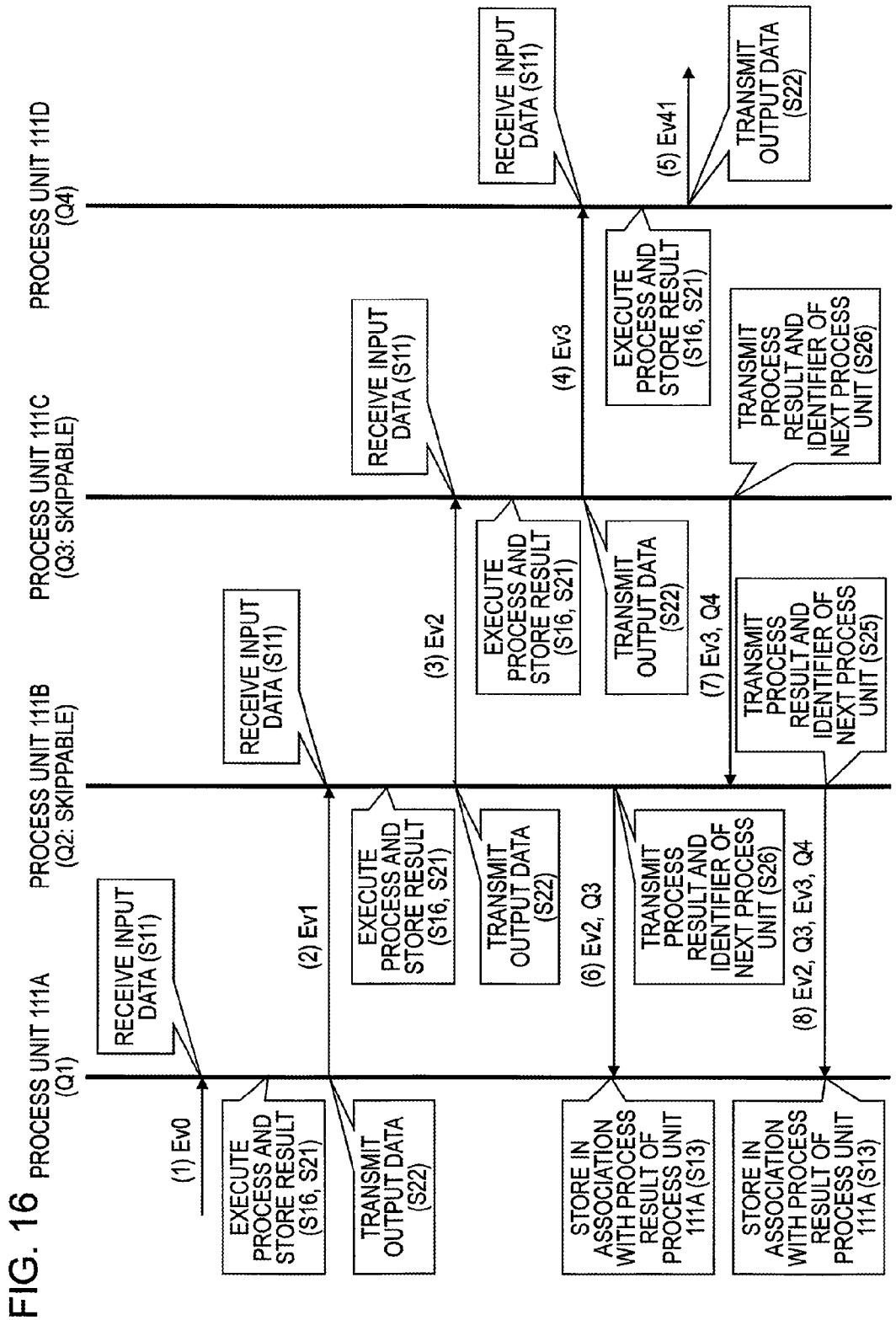
FIG. 16 is a sequence chart for explaining the specific example of the execution management process in the first embodiment.
Figure 17:
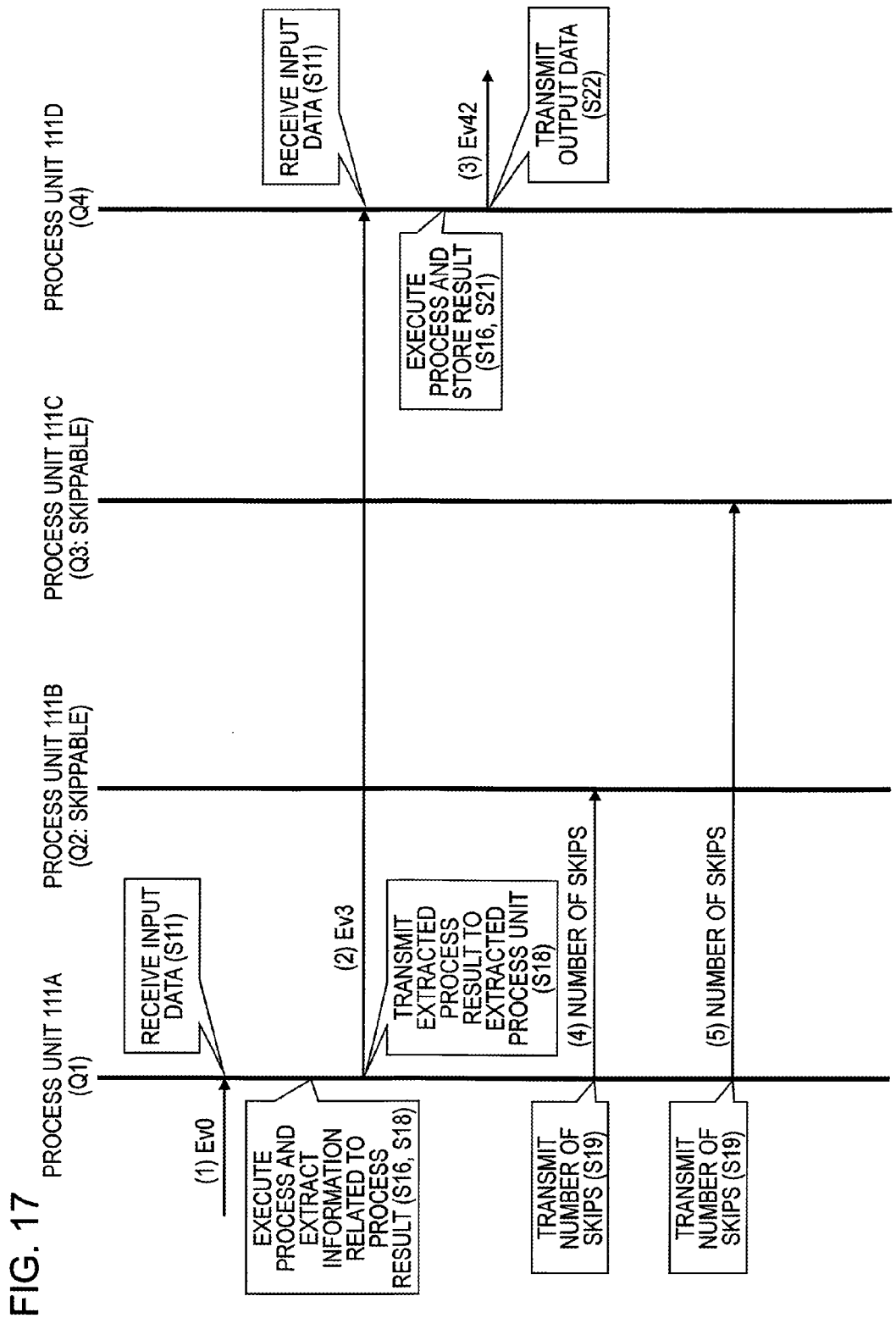
FIG. 17 is a sequence chart for explaining the specific example of the execution management process in the first embodiment.
Figure 18:
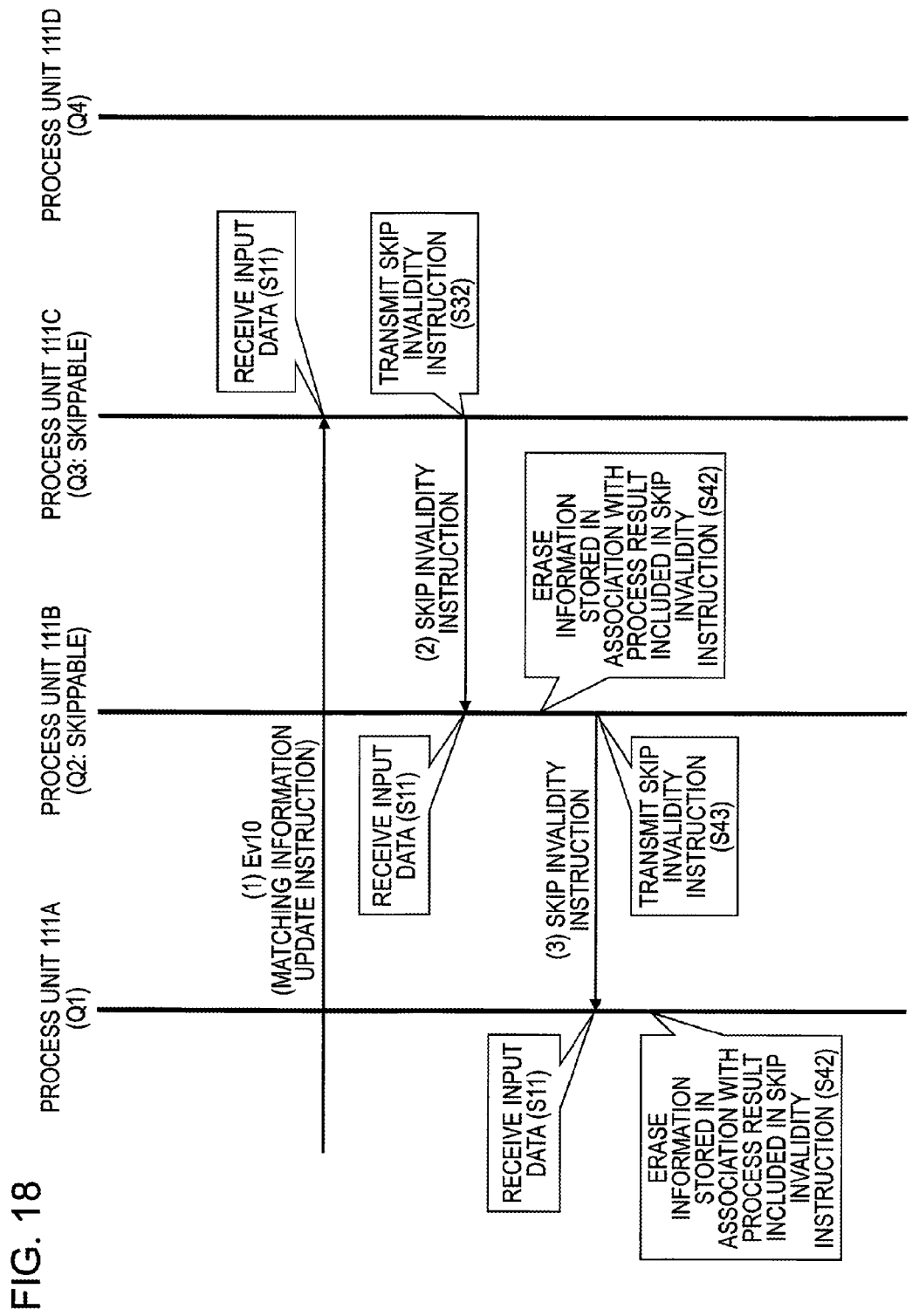
FIG. 18 is a sequence chart for explaining the specific example of the execution management process in the first embodiment.
Figure 19:
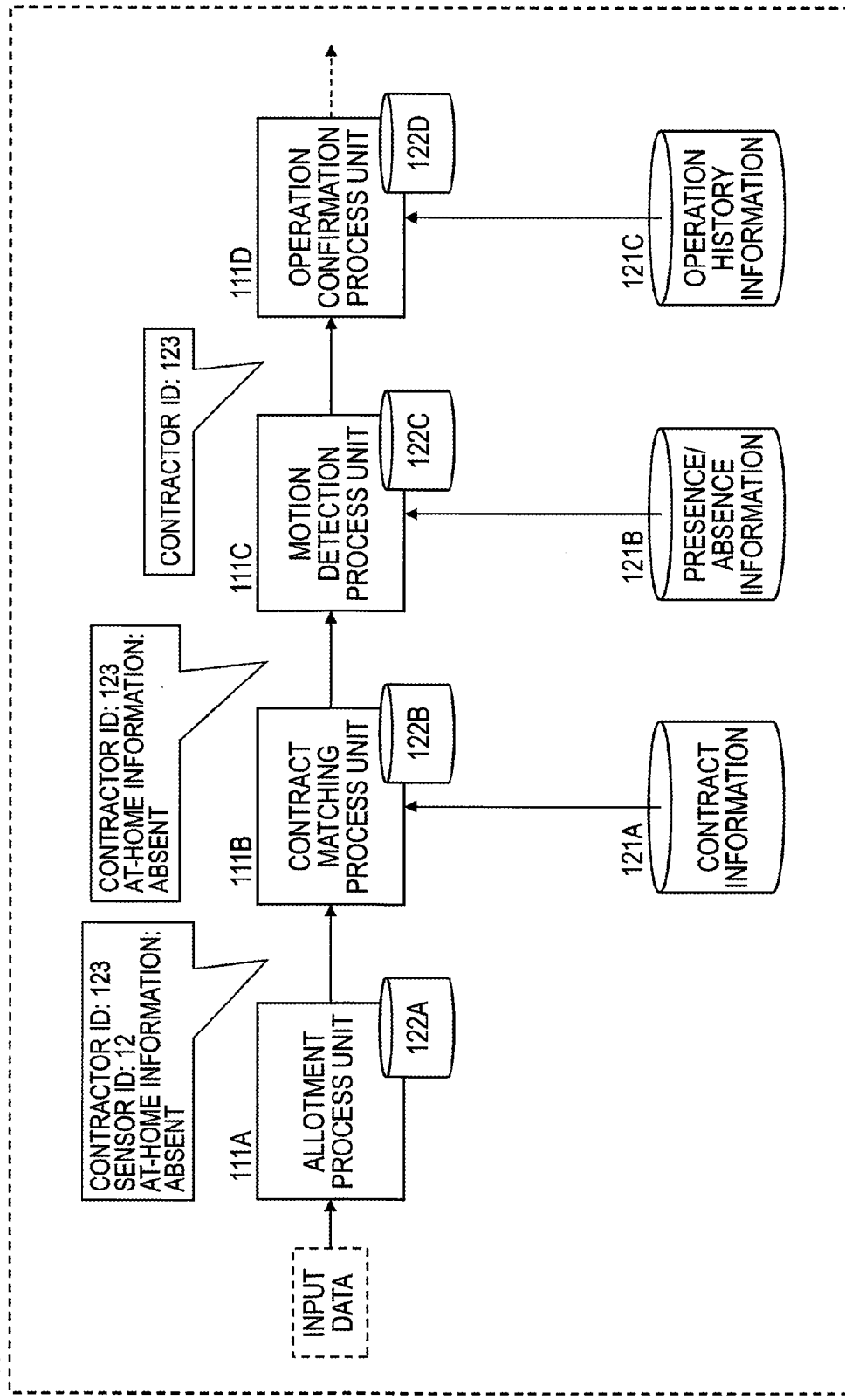
FIG. 19 is a view for explaining the specific example of the execution management process in the first embodiment.

Next, a specific example of the execution management process in the first embodiment will be described. Each of FIGS. 16 to 18 is a sequence chart for explaining the specific example of the execution management process in the first embodiment. In addition, FIG. 19 is a view for explaining the specific example of the execution management process in the first embodiment. The specific example of the execution management process in FIGS. 16 to 18 will be described with reference to FIGS. 12 to 14 and FIG. 19.

[The Configuration of the Process Cooperation System 10 in FIG. 19]

First, the configuration of the process cooperation system 10 in the example in FIG. 19 will be described. The process cooperation system 10 in FIG. 19 is different from the process cooperation system 10 in FIG. 7 in that an operation confirmation process unit 111D is present after the motion detection process unit 111C. Note that description of the subsequent process of the operation confirmation process unit 111D will be omitted.

In the example in FIG. 19, the operation confirmation process unit 111D performs its process based on, e.g., the process result in the motion detection process unit 111C and the content of operation history information 121C, and transmits the process result to the subsequent process unit in which the process result is to be processed. The operation history information 121C stores, e.g., history information on time of reception of the process result from the motion detection process unit 111C by the operation confirmation process unit 111D. Specifically, the operation confirmation process unit 111D determines, e.g., normality of a sensor (not illustrated) which performs the process of the motion detection process unit 111C. The operation confirmation process unit 111D may determine that the sensor (not illustrated) which performs the process of the motion detection process unit 111C is normal in the case where a difference between time when the new process result is received from the motion detection process unit 111C and time when the previous process result is received is within predetermined time. Note that, in the example in FIG. 19, it is assumed that each of the allotment process unit 111A and the operation confirmation process unit 111D is the process unit which is not skippable, and each of the contract matching process unit 111B and the motion detection process unit 111C is the skippable process unit.

[A Specific Example in FIG. 16]

FIG. 16 is a view illustrating the case where the input data (hereinafter also referred to as Ev0) has been inputted to the process cooperation system 10 ((1) in FIG. 16). In an example in FIG. 16, the allotment process unit 111A (hereinafter also referred to as Q1) performs the process based on Ev0, and stores the process result (hereinafter also referred to as Ev1) in the process information 122A (S16, S21). Subsequently, the allotment process unit 111A transmits Ev1 to the contract matching process unit 111B (hereinafter also referred to as Q2) (S22, (2) in FIG. 16). Similarly, the contract matching process unit 111B performs the process based on Ev1, and stores the process result (hereinafter also referred to as Ev2) in the process information 122B (S16, S21). Then, the contract matching process unit 111B transmits the output data as the process result of the process of the contract matching process unit 111B to the motion detection process unit 111C (hereinafter also referred to as Q3) (S22, (3) in FIG. 16). Similarly, the motion detection process unit 111C performs the process based on Ev2, and stores the process result (hereinafter also referred to as Ev3) in the process information 122C (S16, S21). Then, the motion detection process unit 111C transmits the output data as the process result of the process of the motion detection process unit 111C to the operation confirmation process unit 111D (hereinafter also referred to as Q4) (S22, (4) in FIG. 16). Similarly, the operation confirmation process unit 111D performs the process based on Ev3, and stores the process result (hereinafter also referred to as Ev41) in process information 122D (S16, S21). Then, the operation confirmation process unit 111D transmits the output data as the process result of the process of the operation confirmation process unit 111D to the subsequent process unit (S22, (5) in FIG. 16).

Note that, in the example in FIG. 16, the case where the process results of the allotment process unit 111A and the operation confirmation process unit 111D are Ev1 and Ev41 respectively has been described, and these processes are not skippable, and hence there is a possibility that the process result other than Ev1 and Ev41 is outputted. In the case where the process result of the allotment process unit 111A is the process result other than Ev1, the data transmission unit 113A may transmit the process result to the process unit other than the contract matching process unit 111B.

The contract matching process unit 111B transmits information on Ev2 and Q3 (skip determination information) to the allotment process unit 111A when the contract matching process unit 111B transmits Ev2 to the motion detection process unit 111C (S26, (6) in FIG. 16). Subsequently, when the data reception unit 112A has received the information on Ev2 and Q3, the process information storage unit 115A stores the received information on Ev2 and Q3 in association with Ev1 as the process result of the allotment process unit 111A in the information storage area 120A (S13, NO in S27).

The motion detection process unit 111C transmits information on Ev3 and Q4 to the contract matching process unit 111B when the motion detection process unit 111C transmits Ev3 to the operation confirmation process unit 111D (S26, (7) in FIG. 16). Then, when the data reception unit 112B has received the information on Ev3 and Q4, the process information storage unit 115b stores the received information on Ev3 and Q4 in association with Ev2 as the process result of the contract matching process unit 111B in the information storage area 120b (S13). Further, the contract matching process unit 111B having received the information on Ev3 and Q4 from the motion detection process unit 111C is the skippable process unit, and hence the contract matching process unit 111B may transmit the received information on Ev3, Q4, Ev2, and Q3 to the allotment process unit 111A in response to the reception of the information (YES in S27, S28, (8) in FIG. 16). Subsequently, when the data reception unit 112A has received the information on Ev3, Q4, Ev2, and Q3, the process information storage unit 115A stores the received information on Ev3, Q4, Ev2, and Q3 in association with Ev1 as the process result of the allotment process unit 111A in the information storage area 120A (S13, NO in S27).

[A Specific Example in FIG. 17]

FIG. 17 is a view illustrating the case where Ev0 has been inputted to the process cooperation system 10 again ((1) in FIG. 17). In an example in FIG. 17, the allotment process unit 111A performs the process based on Ev0 (S16). The previous process result which matches the process result is stored in the information storage area 120A (NO in S17), and hence the allotment process unit 111A extracts information related to the matching previous process result from the process information 122A (S18). Specifically, the allotment process unit 111A in the example in FIG. 17 receives the information on Ev2, Q3, Ev3, and Q4 in FIG. 16, and stores the information thereon in association with the information on Ev1 as the input data of the contract matching process unit 111B and the output data of the allotment process unit 111A in the process information 122A (S13). Accordingly, specifically, the allotment process unit 111A transmits one (Ev3) of the extracted process results (Ev2, Ev3) which is executed in the last process unit to one (Q4) of the process units (Q3, Q4) identified by the extracted identifiers which is executed last (S18, (2) in FIG. 17). That is, in the example in FIG. 17, the allotment process unit 111A skips the contract matching process unit 111B and the motion detection process unit 111C, and transmits Ev3 to the operation confirmation process unit 111D. Further, the operation confirmation process unit 111D performs the process based on Ev3, and stores the process result (hereinafter also referred to as Ev42) in the process information 122D (S16, S21). Subsequently, the operation confirmation process unit 111D transmits the output data as the process result of the process of the operation confirmation process unit 111D to the subsequent process unit (S22, (3) in FIG. 17).

After S18, the allotment process unit 111A may transmit information indicative of the execution of the skip (or the number of skips) to the contract matching process unit 111B and the motion detection process unit 111C which are skipped (S19, (4) and (5) in FIG. 17).

[A Specific Example in FIG. 18]

FIG. 18 is a view illustrating the case where the matching information update instruction (Ev10) has been transmitted to the motion detection process unit 111C ((1) in FIG. 18). In an example in FIG. 18, the motion detection process unit 111C having received the matching information update instruction transmits the skip invalidity instruction to the contract matching process unit 111B as the immediately prior process unit (S32, (2) in FIG. 18). In the contract matching process unit 111B having received the skip invalidity instruction, the process result of the contract matching process unit 111B is stored in the process information 122B (YES in S41). Accordingly, the process information erasing unit 117B erases the information stored in association with the process result of the contract matching process unit 111B included in the skip invalidity instruction (S42). Further, the contract matching process unit 111B transmits the skip invalidity instruction to the allotment process unit 111A as the immediately prior process unit (S43, (3) in FIG. 18). In the allotment process unit 111A having received the skip invalidity instruction, the process result of the allotment process unit 111A is stored in the process information 122A (YES in S41). Accordingly, the process information erasing unit 117A erases the information stored in association with the process result of the allotment process unit 111A included in the skip invalidity instruction (S42).

[Second Embodiment]

Figure 20:
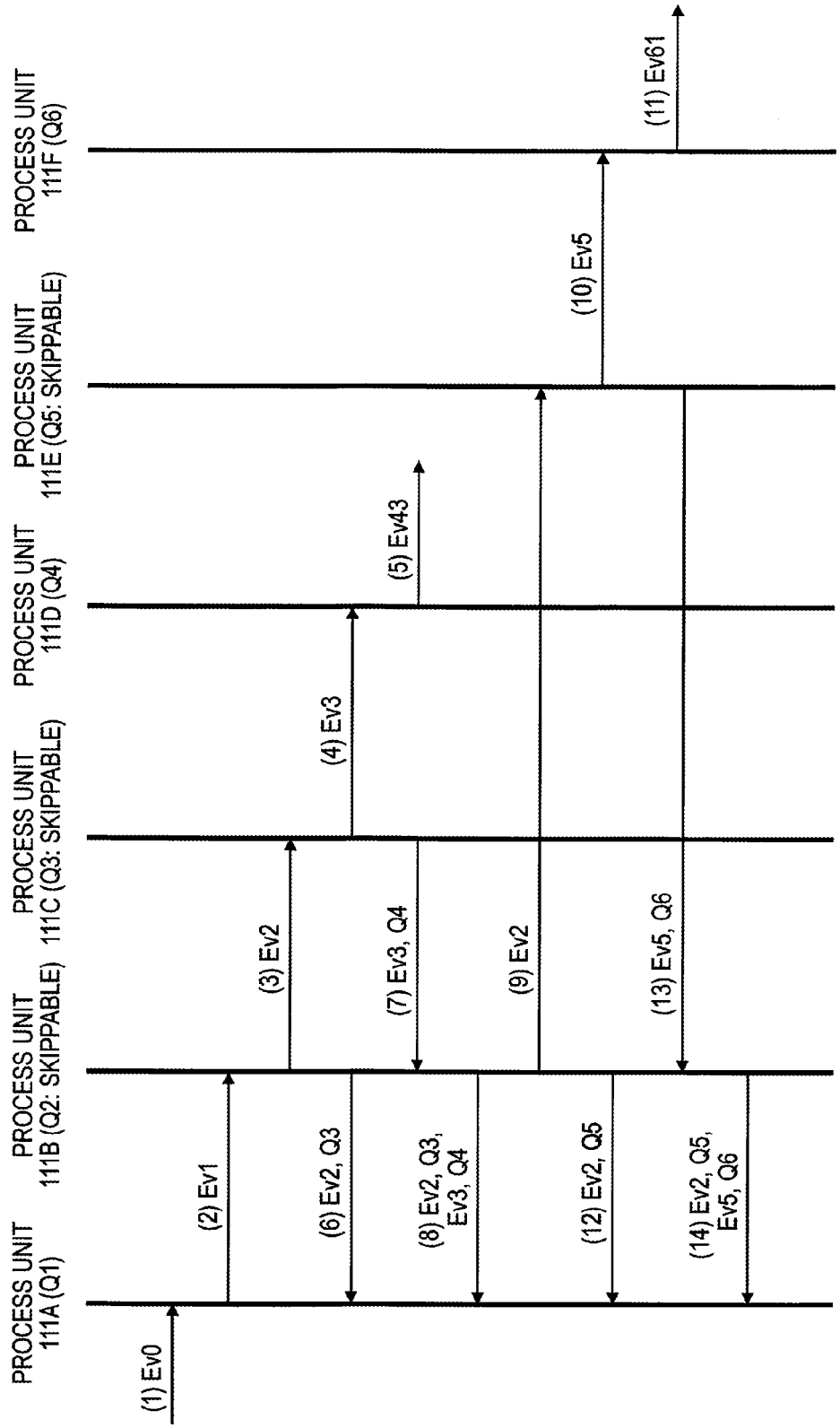
FIG. 20 is a flow chart for explaining the execution management process in the second embodiment.
Figure 21:
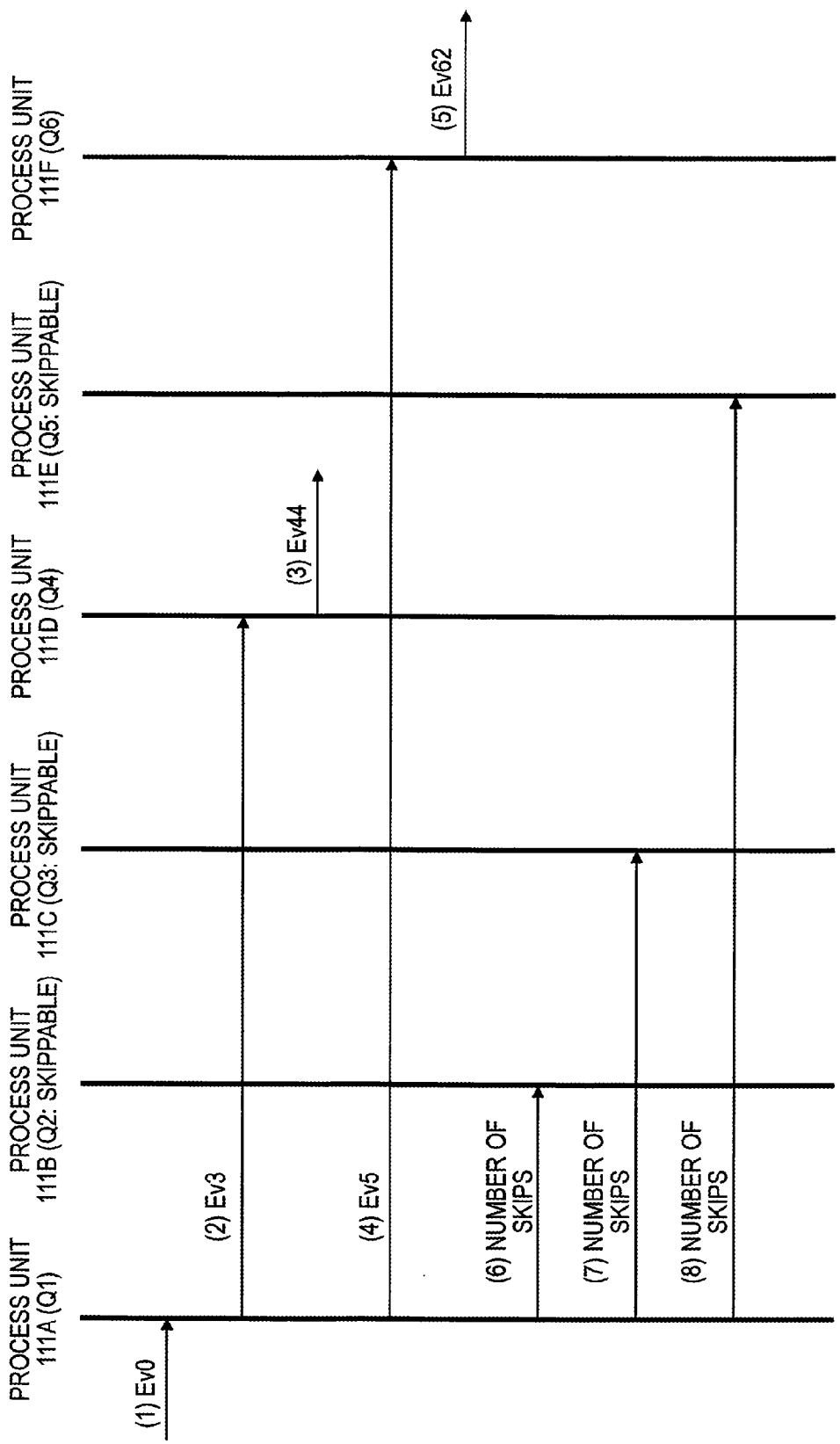
FIG. 21 is a flow chart for explaining the execution management process in the second embodiment.
Figure 22:
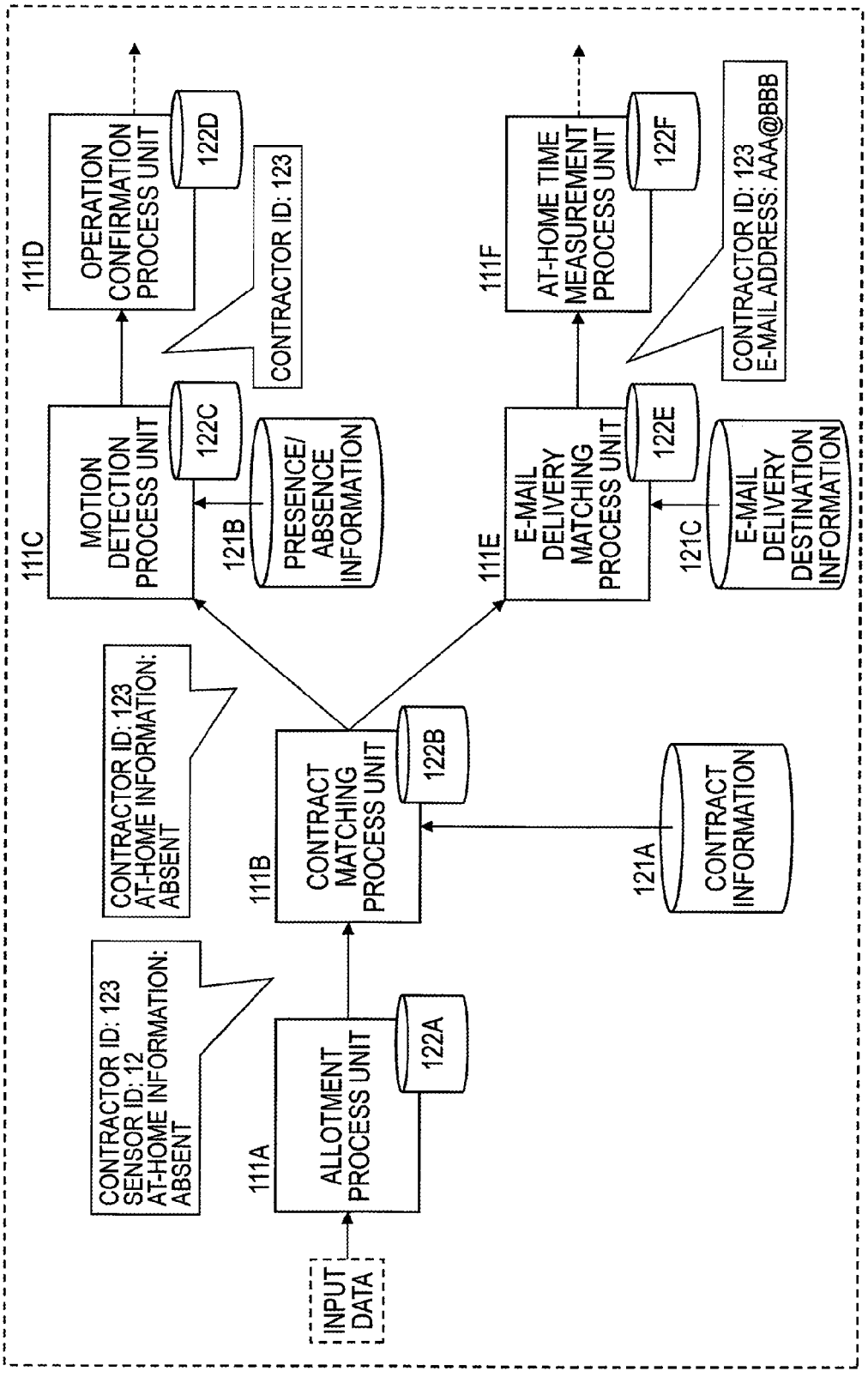
FIG. 22 is a view for explaining the execution management process in the second embodiment.

Next, a second embodiment will be described. Each of FIGS. 20 and 21 is a flow chart for explaining the execution management process in the second embodiment. In addition, each of FIGS. 22 and 23 is a view for explaining the execution management process in the second embodiment. The details of the execution management process in FIGS. 20 and 21 will be described with reference to FIGS. 12 to 14 and FIGS. 22 and 23.

[The Configuration of the Process Cooperation System 10 in FIG. 22]

First, the configuration of the process cooperation system 10 in an example in FIG. 22 will be described. The process cooperation system 10 in FIG. 22 is different from the process cooperation system 10 in FIG. 19 in that the motion detection process unit 111C and an e-mail delivery matching process unit 111E are present as the subsequent process units of the contract matching process unit 111B. In addition, in the example in FIG. 22, after the e-mail delivery matching process unit 111E, an at-home time measurement process unit 111F is present. Note that the description of subsequent process units of the operation confirmation process unit 111D and the at-home time measurement process unit 111F will be omitted.

In the example in FIG. 22, for example, in the case where information of "12" indicative of "MOTION SENSOR" is included as the sensor ID of the input data, it is assumed that the contract matching process unit 111B transmits the process result of the process of the contract matching process unit 111B to the motion detection process unit 111C and the e-mail delivery matching process unit 111E.

In addition, in the example in FIG. 22, the e-mail delivery matching process unit 111E performs a process of extracting an e-mail address of the contractor to which an e-mail is to be delivered based on the process result in the contract matching process unit 111B and the content of e-mail delivery destination information (not illustrated), and transmits the process result to the subsequent process unit in which the process result is to be processed. As illustrated in FIG. 23, the e-mail delivery destination information stores, e.g., information on the e-mail address which is used when a necessity to contact the contractor by e-mail arises for each contractor. Specifically, in the e-mail delivery destination information in FIG. 23, the contractor having the contractor ID "123" stores "AAA@BBB" as the e-mail address. The contractor having the contractor ID "124" stores "DDD@BBB" and "EEE@BBB" as the e-mail addresses. The contractor having the contractor ID "125" stores "GGG@FFF" as the e-mail address.

Further, in the example in FIG. 22, the at-home time measurement process unit 111F performs a process of measuring the at-home time of the contractor based on the process result in the e-mail delivery matching process unit 111E and the content of at-home time information (not illustrated), and transmits the process result to the subsequent process unit in which the process result is to be processed. Specifically, the e-mail delivery matching process unit 111E and the at-home time measurement process unit 111F in the example in FIG. 22 measure the at-home time of the contractor periodically, e.g., in the case where the contractor is an aged person. In the case where the at-home time exceeds a predetermined threshold value (e.g., 24 hours), the process cooperation system 10 may deliver the e-mail which informs the situation of the contractor to the e-mail address (the e-mail address of a relative of the contractor or the like) extracted in the e-mail delivery matching process unit 111E.

[A Specific Example of the Execution Management Process in the Second Embodiment (1)]

Next, a specific example of the execution management process in the second embodiment will be described. Each of FIGS. 20 and 21 is a sequence chart for explaining the specific example of the execution management process in the second embodiment. The specific example of the execution management process in FIGS. 20 and 21 will be described with reference to FIG. 22.

[The Specific Example in FIG. 20]

FIG. 20 is a view illustrating the case where the input data (hereinafter referred to as Ev0) has been inputted to the process cooperation system 10 ((1) in FIG. 20). In an example in FIG. 20, similarly to the example in FIG. 16, the allotment process unit 111A (hereinafter also referred to as Q1) performs the process based on Ev0, and stores the process result (hereinafter also referred to as Ev1) in the process information 122A (S16, S21). Subsequently, the allotment process unit 111A transmits Ev1 to the contract matching process unit 111B (hereinafter also referred to as Q2) (S22, (2) in FIG. 20). Similarly, the contract matching process unit 111B performs the process based on Ev1, and stores the process result (hereinafter also referred to as Ev2) in the process information 122B (S16, S21). Subsequently, the contract matching process unit 111B transmits the output data as the process result of the process of the contract matching process unit 111B to the motion detection process unit 111C (hereinafter also referred to as Q3) (S22, (3) in FIG. 20). Similarly, the motion detection process unit 111C performs the process based on Ev2, and stores the process result (hereinafter also referred to as Ev3) in the process information 122C (S16, S21). Subsequently, the motion detection process unit 111C transmits the output data as the process result of the process of the motion detection process unit 111C to the operation confirmation process unit 111D (hereinafter also referred to as Q4) (S22, (4) in FIG. 20). Similarly, the operation confirmation process unit 111D performs the process based on Ev3, and stores the process result (hereinafter also referred to as Ev43) in the process information 122D (S16, S21). Subsequently, the operation confirmation process unit 111D transmits the output data as the process result of the process of the operation confirmation process unit 111D to the subsequent process unit (S22, (5) in FIG. 20).

In addition, when the contract matching process unit 111B transmits Ev2 to the motion detection process unit 111C, the contract matching process unit 111B transmits the information on Ev2 and Q3 to the allotment process unit 111A (S26, (6) in FIG. 20). Subsequently, when the data reception unit 112A has received the information on Ev2 and Q3, the process information storage unit 115A stores the received information on Ev2 and Q3 in association with Ev1 as the process result of the allotment process unit 111A in the information storage area 120A (S13, NO in S27).

Further, when the motion detection process unit 111C transmits Ev3 to the operation confirmation process unit 111D, the motion detection process unit 111C transmits the information on Ev3 and Q4 to the contract matching process unit 111B (S26, (7) in FIG. 20). Subsequently, when the data reception unit 112b has received the information on Ev3 and Q4, the process information storage unit 115b stores the received information on Ev3 and Q4 in association with Ev2 as the process result of the contract matching process unit 111b in the information storage area 120b (S13). The contract matching process unit 111b having received the information on Ev3 and Q4 from the motion detection process unit 111C is the skippable process unit, and hence the contract matching process unit 111b may transmit the received information on Ev3, Q4, Ev2, and Q3 to the allotment process unit 111A in response to the reception of the information (YES in S27, S28, (8) in FIG. 20). Subsequently, when the data reception unit 112A has received the information on Ev3, Q4, Ev2, and Q3, the process information storage unit 115A stores the received information on Ev3, Q4, Ev2, and Q3 in association with Ev1 as the process result of the allotment process unit 111A in the information storage area 120A (S13, NO in S27).

On the other hand, the contract matching process unit 111B having performed the process based on Ev1 also transmits Ev2 as the process result based on Ev1 to the e-mail delivery matching process unit 111E (hereinafter also referred to as Q5) (S22, (9) in FIG. 20). Subsequently, the e-mail delivery matching process unit 111E performs the process based on Ev2, and stores the process result (hereinafter referred to as Ev5) in the process information 122E (S16, S21). Further, the e-mail delivery matching process unit 111E transmits the output data as the process result of the process of the e-mail delivery matching process unit 111E to the at-home time measurement process unit 111F (S22, (10) in FIG. 20). Similarly, the at-home time measurement process unit 111F performs the process based on Ev5, and stores the process result (hereinafter also referred to as Ev61) in process information 122F (S16, S21). Subsequently, the at-home time measurement process unit 111F transmits the output data as the process result of the process of the at-home time measurement process unit 111F to the subsequent process unit (S22, (11) in FIG. 20). Note that the contract matching process unit 111b may determine that the transmission destinations when the process result is Ev2 are the motion detection process unit 111C and the e-mail delivery matching process unit 111E by referring to, e.g., the process connection information 124A.

In addition, when the contract matching process unit 111b transmits Ev2 to the e-mail delivery matching process unit 111E, the contract matching process unit 111b transmits information on Ev2 and Q5 to the allotment process unit 111A (S26, (12) in FIG. 20). Subsequently, when the data reception unit 112A has received the information on Ev2 and Q5, the process information storage unit 115A stores the received information on Ev2 and Q5 in association with Ev1 as the process result of the allotment process unit 111A in the information storage area 120A (S13, NO in S27).

Further, when the e-mail delivery matching process unit 111E transmits Ev5 to the at-home time measurement process unit 111F, the e-mail delivery matching process unit 111E transmits information on Ev5 and Q6 to the contract matching process unit 111B (S26, (13) in FIG. 20). Subsequently, when the data reception unit 112B has received the information on Ev5 and Q6, the process information storage unit 115B stores the received information on Ev5 and Q6 in association with Ev2 as the process result of the contract matching process unit 111B in the information storage area 120B (S13). The contract matching process unit 111B having received the information on Ev5 and Q6 from the e-mail delivery matching process unit 111E is the skippable process unit, and hence the contract matching process unit 111B may transmit the received information on Ev5, Q6, Ev2, and Q5 to the allotment process unit 111A in response to the reception of the information (YES in S27, S28, (14) in FIG. 20). Subsequently, when the data reception unit 112A has received the information on Ev5, Q6, Ev2, and Q5, the process information storage unit 115A stores the received information on Ev5, Q6, Ev2, and Q5 in association with Ev1 as the process result of the allotment process unit 111A in the information storage area 120A (S13, NO in S27).

[A Specific Example in FIG. 21]

FIG. 21 is a view illustrating the case where Ev0 has been inputted to the process cooperation system 10 again ((1) in FIG. 21). In an example in FIG. 21, the allotment process unit 111A performs the process based on Ev0 (S16). The previous process result which matches the process result is stored in the information storage area 120A (NO in S17), and hence the allotment process unit 111A extracts information related to the matching previous process result from the process information 122A (S18). Specifically, the allotment process unit 111A in the example in FIG. 17 receives the information on Ev2, Q3, Ev3, and Q4 (hereinafter also referred to as information A) and the information on Ev2, Q5, Ev5, and Q6 (hereinafter also referred to as information B) in FIG. 16, and stores the information A and the information B in association with the information on Ev1 as the input data of the contract matching process unit 111B and the output data of the allotment process unit 111A in the process information 122A (S13). Accordingly, the allotment process unit 111A transmits one (Ev3) of the process results (Ev2, Ev3) extracted from the information A which is executed in the last process unit to one (Q4) of the process units (Q3, Q4) identified by the identifiers extracted from the information A which is executed last ((2) in FIG. 21). That is, in the example in FIG. 21, the allotment process unit 111A skips the contract matching process unit 111B and the motion detection process unit 111C, and transmits Ev3 to the operation confirmation process unit 111D. Next, the operation confirmation process unit 111D performs the process based on Ev3, and stores the process result (hereinafter also referred to as Ev44) in the process information 122D (S16, S21). Subsequently, the operation confirmation process unit 111D transmits the output data as the process result of the process of the operation confirmation process unit 111D to the subsequent process unit (S22, (3) in FIG. 21).

In addition, the allotment process unit 111A transmits one (Ev5) of the process results (Ev2, Ev5) extracted from the information B which is executed in the last process unit to one (Q6) of the process units (Q5, Q6) identified by the identifiers extracted from the information B which is executed last ((4) in FIG. 21). That is, in the example in FIG. 21, the allotment process unit 111A skips the contract matching process unit 111B and the e-mail delivery matching process unit 111E, and transmits Ev5 to the at-home time measurement process unit 111F. Next, the at-home time measurement process unit 111F performs the process based on Ev5, and stores the process result (hereinafter also referred to as Ev62) in the process information 122F (S16, S21). Subsequently, the at-home time measurement process unit 111F transmits the output data as the process result of the process of the at-home time measurement process unit 111F to the subsequent process unit (S22, (5) in FIG. 21).

Further, after S18, the allotment process unit 111A may transmit the information indicative of execution of the skip (or the number of skips) to the contract matching process unit 111B, the motion detection process unit 111C, and the e-mail delivery matching process unit 111E which are skipped (S19, (6), (7), and (8) in FIG. 21).

[Change of the Stored Content of the Process Information]

Figure 24:
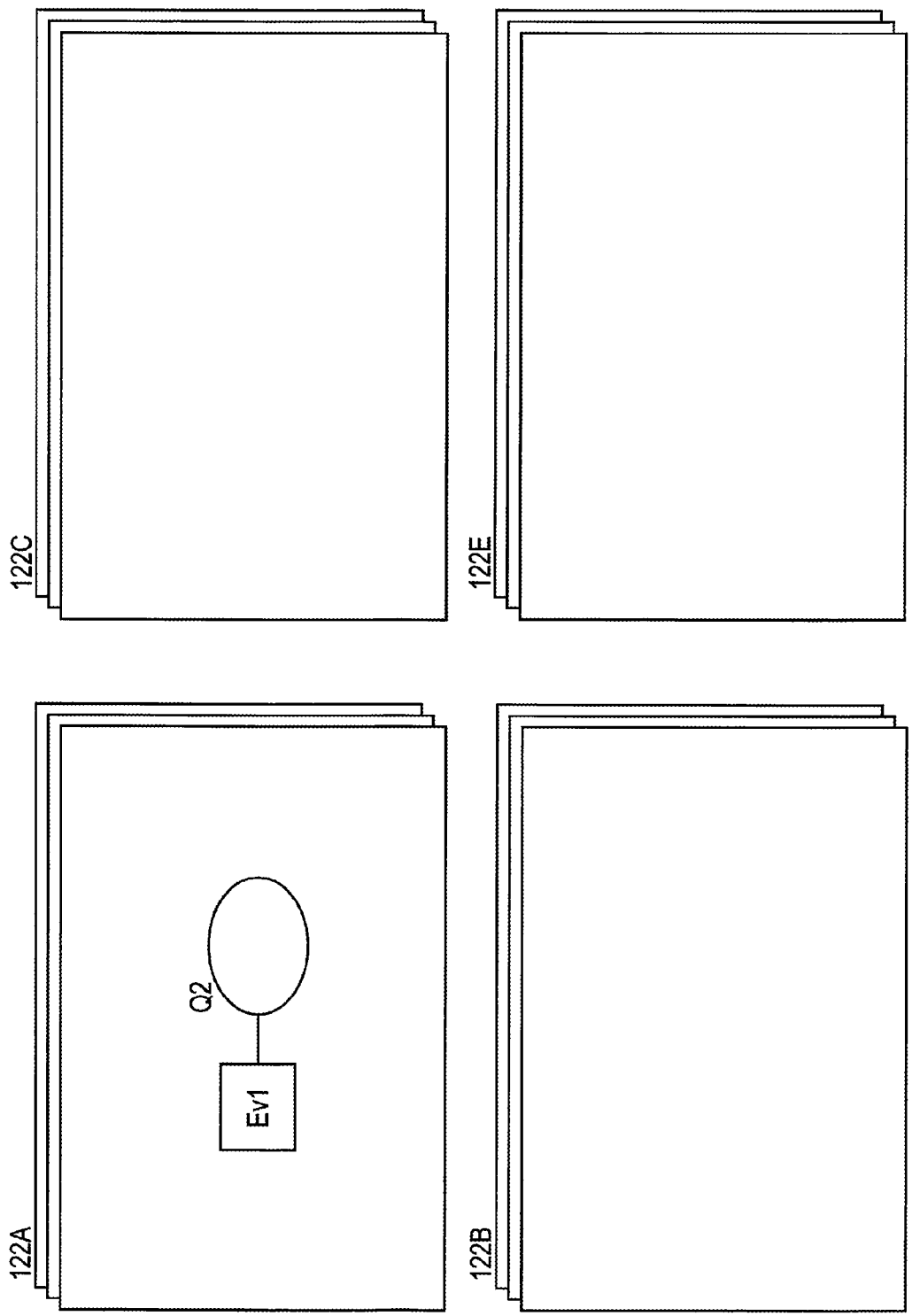
FIG. 24 is a view for explaining the change of the content of the information stored in the process information in the state in FIG. 20.
Figure 25:
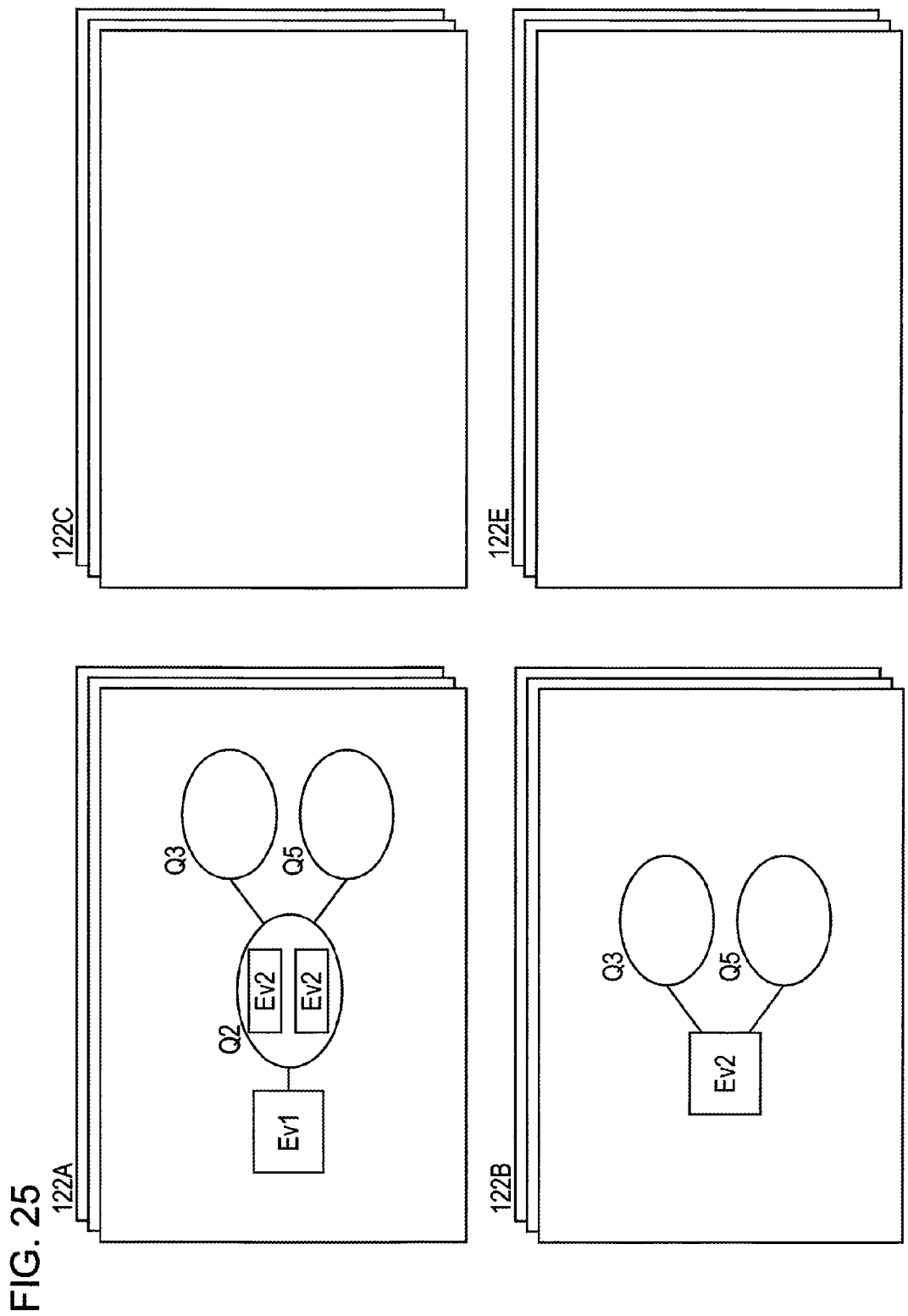
FIG. 25 is a view for explaining the change of the content of the information stored in the process information in the state in FIG. 20.
Figure 26:
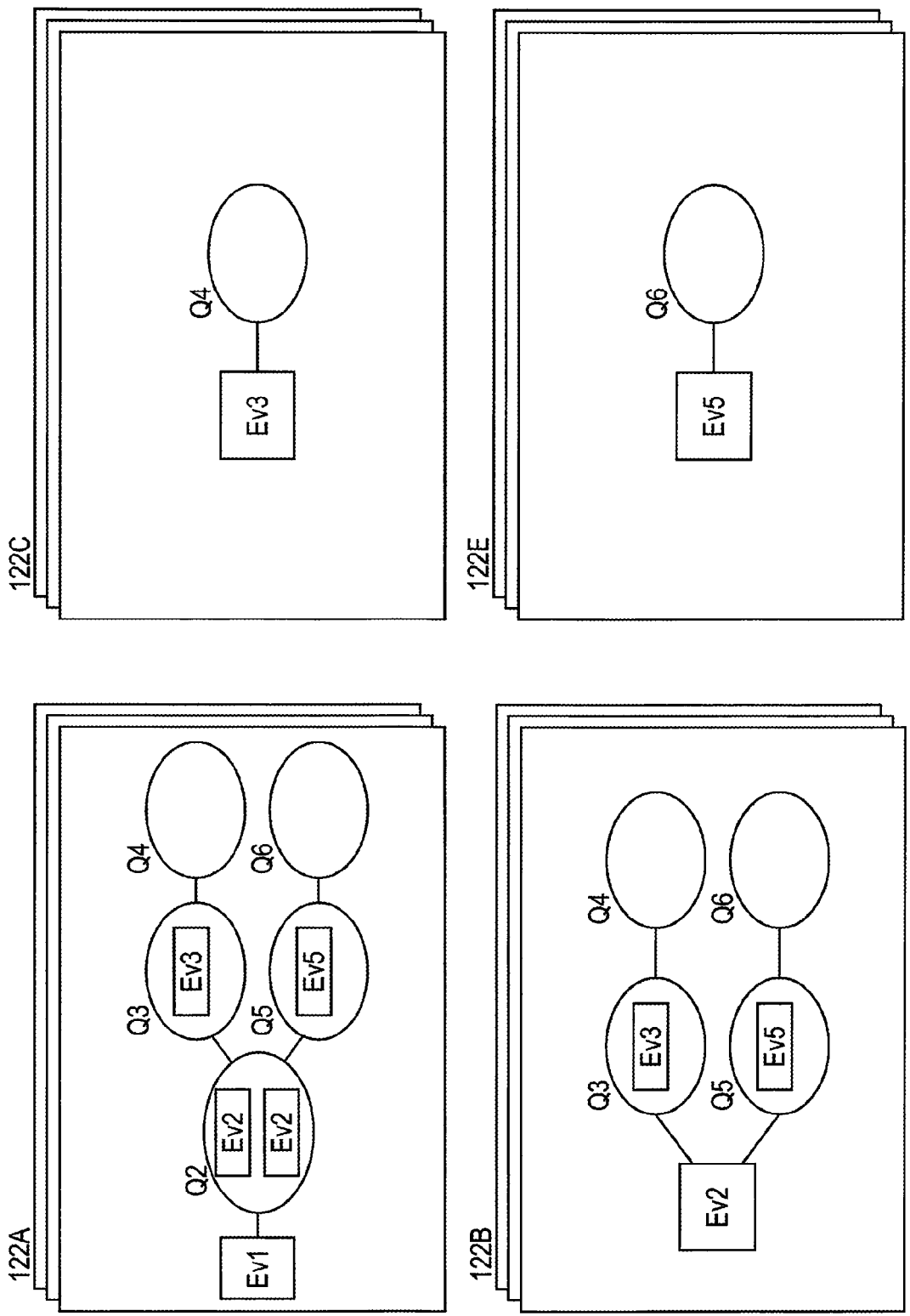
FIG. 26 is a view for explaining the change of the content of the information stored in the process information in the state in FIG. 20.

Next, the change of the content of information stored in the process information will be described. Each of FIGS. 24 to 26 is a view for explaining the change of the content of the information stored in the process information in the state in FIG. 20. Note that, in examples in FIGS. 24 to 26, each process information manages the process information for each of the process results (Ev1, Ev2, and the like) of the process units.

FIG. 24 is a view illustrating the case where the allotment process unit 111A has transmitted Ev1 as the process result of the process of the allotment process unit 111A to the contract matching process unit 111B in the example in FIG. 20. Specifically, in the example in FIG. 24, in the process information 122A, Ev1 and the information on Q2 as the process unit to which Ev1 has been transmitted are stored in association with each other.

FIG. 25 is a view illustrating the case where the contract matching process unit 111B has transmitted Ev2 to each of the motion detection process unit 111C and the e-mail delivery matching process unit 111E, and has received the skip determination information from each of the motion detection process unit 111C and the e-mail delivery matching process unit 111E in the example in FIG. 20. Specifically, in FIG. 25, in the process information 122B, Ev2 and the information on Q3 and Q5 as the process units to which Ev2 has been transmitted are stored in association with each other. In addition, in the process information 122A, the skip determination information received from the contract matching process unit 111B is stored. Specifically, in the process information 122A, Ev1, Q2, Ev2, and Q3 are stored in association with each other. In addition, in the process information 122A, Ev1, Q2, Ev2, and Q5 are stored in association with each other. Note that, in Q2 of the process information 122A in FIG. 25, it is assumed that Ev2 described in the upper part is the information associated with Q3, and Ev2 described in the lower part is the information associated with Q5.

FIG. 26 is a view illustrating the case where the motion detection process unit 111C has transmitted Ev3 to the operation confirmation process unit 111D, and has received the skip determination information from the operation confirmation process unit 111D in the example in FIG. 20. FIG. 26 is a view illustrating the case where the e-mail delivery matching process unit 111E has transmitted Ev5 to the at-home time measurement process unit 111F, and has received the skip determination information from the at-home time measurement process unit 111F in the example in FIG. 20. Specifically, in FIG. 26, in the process information 122C, Ev3 and Q4 as the process unit to which Ev3 has been transmitted are stored in association with each other. In addition, in the process information 122E, Ev5 and Q6 as the process unit to which Ev5 has been transmitted are stored in association with each other. Further, in the process information 122B, the skip determination information received from each of the motion detection process unit 111C and the e-mail delivery matching process unit 111E is stored. Specifically, Ev2, Q3, Ev3, and Q4 are stored in association with each other. In addition, Ev2, Q5, Ev5, and Q6 are stored in association with each other. Further, in the process information 122A, the skip determination information received from the contract matching process unit 111B is stored. Specifically, Ev1, Q2, Ev2, Q3, Ev3, and Q4 are stored in association with each other. In addition, Ev1, Q2, Ev2, Q5, Ev5, and Q6 are stored in association with each other.

That is, each of the process units in the examples in FIGS. 24 to 26 stores the process information in the tree structure. Consequently, each process unit extracts the tip portion of the tree structure in the process information, whereby it becomes possible to easily determine the process result to be transmitted and the process unit to which the process result is to be transmitted. Specifically, in the example in FIG. 26, the process units positioned closest to the tip portion of the tree structure of the process information 122A are Q4 and Q6, and the process results positioned closest to Q4 and Q6 are Ev3 and Ev5. Accordingly, the allotment process unit 111A can easily determine that Ev5 is to be transmitted to Q6, and Ev3 is to be transmitted to Q4.

Thus, in the second embodiment, even in the case where a plurality of the subsequent process units are present, each process unit stores the process information in the tree structure, whereby it is possible to easily determine the process unit to which the process result is to be transmitted and the process result to be transmitted to the process unit.

[A Process in the Case where the Skip Determination Information is Received from Only a Part of a Plurality of Subsequent Process Units]

Figure 27:
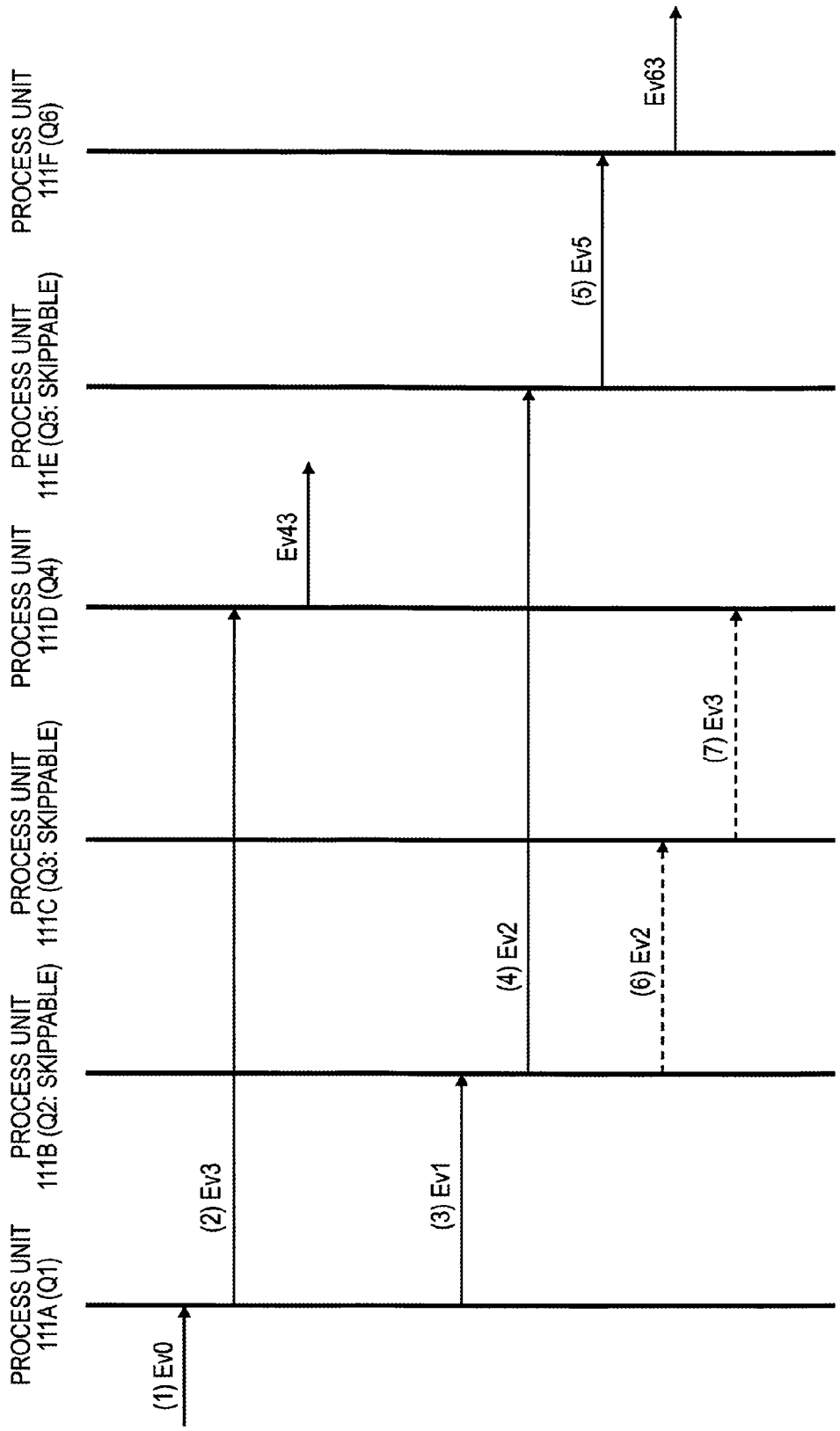
FIG. 27 is a sequence chart for explaining a specific example of the execution management process in the second embodiment.
Figure 28:
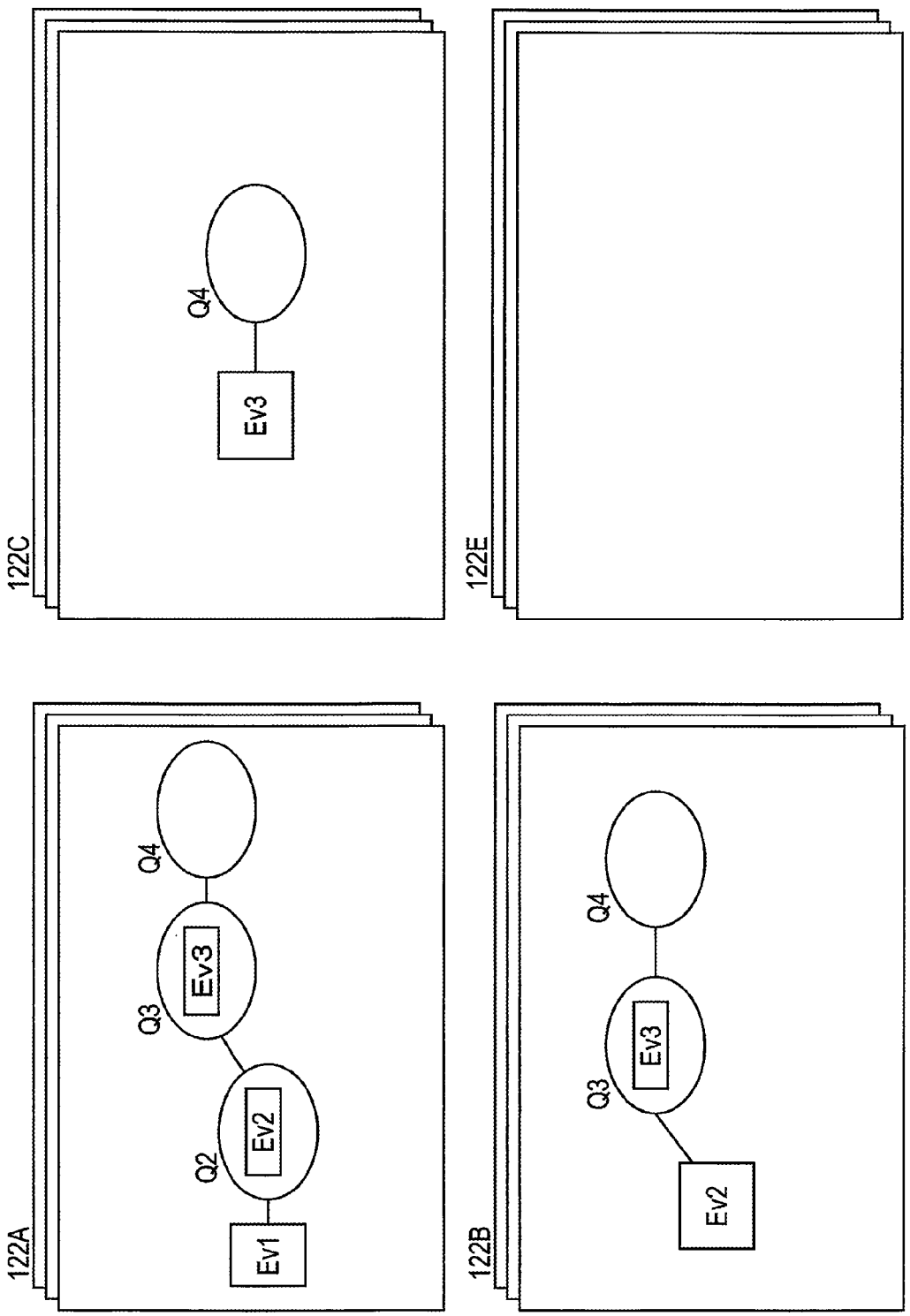
FIG. 28 is a view for explaining the process information in the second embodiment.

FIG. 27 is a sequence chart for explaining a specific example of the execution management process in the second embodiment. FIG. 28 is a view for explaining the process information in the second embodiment. Note that, in FIG. 27, the description of the transmission of the skip determination information will be omitted.

In an example in FIG. 27, the allotment process unit 111A having performed the process based on the input data (Ev0) skips the contract matching process unit 111B and the motion detection process unit 111C, and transmits the process result (Ev1) to the operation confirmation process unit 111D ((1) and (2) in FIG. 27). On the other hand, in the example in FIG. 27, the allotment process unit 111A transmits the process result to the at-home time measurement process unit 111F via the contract matching process unit 111B and the e-mail delivery matching process unit 111E (without skipping the process units) ((3), (4), and (5) in FIG. 27).

That is, in the example in FIG. 27, the contract matching process unit 111B having two subsequent process units transmits the process result of the process of the contract matching process unit 111B to the e-mail delivery matching process unit 111E as one of the two subsequent process units ((4) in FIG. 27). In contrast to this, with regard to the motion detection process unit 111C as the other one of the two subsequent process units, the allotment process unit 111A transmits the process result directly to the operation confirmation process unit 111D ((2) in FIG. 27). Accordingly, in the example in FIG. 27, it is not necessary for the contract matching process unit 1116 to transmit the process result of the process of the contract matching process unit 1116 to the motion detection process unit 111C.

However, as illustrated in FIG. 27, the contract matching process unit 1116 having received the process result from the allotment process unit 111A refers to the process connection information 124B, and transmits the process result to each of the motion detection process unit 111C and the e-mail delivery matching process unit 111E ((4) and (6) in FIG. 27). Accordingly, in the example in FIG. 27, there is a possibility that the operation confirmation process unit 111D receives the same process result from both of the allotment process unit 111A and the motion detection process unit 111C ((2) and (7) in FIG. 27). In this case, the process cooperation system 10 is not able to secure the integrity of the data and may affect the services to the user.

To cope with this, in the second embodiment, the process unit having a plurality of the subsequent process units may suspend the transmission of the skip determination information to the prior process unit until the process unit receives the process results from all of the subsequent process units (S25, S26, and S28 in FIG. 13). Specifically, in the example in FIG. 27, the contract matching process unit 111B waits until the contract matching process unit 111B receives the skip determination information from both of the motion detection process unit 111C and the e-mail delivery matching process unit 111E. Subsequently, when the contract matching process unit 111B has received the skip determination information from both of the motion detection process unit 111C and the e-mail delivery matching process unit 111E, the contract matching process unit 111B transmits the skip determination information including the received information to the allotment process unit 111A. With this, in the example in FIG. 27, the contract matching process unit 111B can prevent the occurrence of a state in which the contract matching process unit 111B is skipped for one of the subsequent process units, and the process result is transmitted to the other of the subsequent process units from the contract matching process unit 111B. As a result, it is possible to prevent the occurrence of the process unit which receives the same process result a plurality of times.

On the other hand, FIG. 28 is an example of the process information in the case of FIG. 27. In FIG. 27, in the process from the allotment process unit 111A to the operation confirmation process unit 111D ((2) in FIG. 27), the contract matching process unit 111B and the motion detection process unit 111C are skipped. In addition, in FIG. 27, in the processes from the allotment process unit 111A to the at-home time measurement process unit 111F ((3), (4), and (5) in FIG. 27), the skip is not performed, and the process in each process unit is executed. Consequently, in the process information 122B in FIG. 28, the information on the process results of the contract matching process unit 111B and the motion detection process unit 111C which are skipped is stored. Specifically, in the process information 122C in FIG. 28, Ev3 and Q4 are stored in association with each other. In addition, in the process information 122B in FIG. 28, Ev2, Q3, Ev3, and Q4 are stored in association with each other. Further, in the process information 122A in FIG. 28, Ev1, Q2, Ev2, Q3, Ev3, and Q4 are stored in association with each other.

Herein, in the example in FIG. 28, the allotment process unit 111A transmits the process result of the motion detection process unit 111C to the operation confirmation process unit 111D based on the skip determination information from the contract matching process unit 111B stored in the process information 122A. That is, in the case where the contract matching process unit 111B has transmitted the skip determination information to the allotment process unit 111A, the information stored in the process information 122B is also stored in the process information 122A. As a result, in the case where the contract matching process unit 111B has transmitted the skip determination information to the allotment process unit 111A, it follows the allotment process unit 111A transmits the process result to the process unit on which the information is included in the skip determination information.

To cope with this, for example, the contract matching process unit 111B checks the process information 122B before the contract matching process unit 111B transmits the process result of the process of the contract matching process unit 111B to the subsequent process unit. Then, even when the subsequent process unit is the subsequent process unit to which the process result of the process of the contract matching process unit 111B is to be transmitted based on the process connection information 124B, in the case where it can be determined that the prior process unit (the allotment process unit 111A) has transmitted the process result to the subsequent process unit based on the process information 122B, the contract matching process unit 111B may suspend the transmission of the process result to the subsequent process unit.

Specifically, in the example in FIG. 28, in the case where the contract matching process unit 111B has received the process result from the allotment process unit 111A, the contract matching process unit 111B refers to the process connection information 124B first, and determines that the subsequent process units to which the process result of the process of the contract matching process unit 111B is to be transmitted are the motion detection process unit 111C and the e-mail delivery matching process unit 111E. Next, the contract matching process unit 111B refers to the process information 122B, and determines that the information including the process result (Ev2) of the process of the contract matching process unit 111B and the identifier (Q3) of the process unit as the transmission destination of the process result is previously transmitted to the allotment process unit 111A. Subsequently, the contract matching process unit 111B can determine that the process result of the process of the contract matching process unit 111B needs to be transmitted to the e-mail delivery matching process unit 111E, but the process result thereof does not need to be transmitted to the motion detection process unit 111C. With this, it is possible to prevent the occurrence of the process unit which receives the same process result a plurality of times. Note that, in this case, as described in the above example, it is not necessary to suspend the transmission of the skip determination information to the prior process unit until the process results are received from all of the subsequent process units.

In addition, in the example in FIG. 27, before the allotment process unit 111A transmits the process result of the process of the allotment process unit 111A, the allotment process unit 111A may refer to the process connection information 124, and determine whether or not the process unit having a plurality of the subsequent process units is present between the allotment process unit 111A and the process unit as the transmission destination. Specifically, in the example in FIG. 28, the allotment process unit 111A refers to the process information 122A, and transmits the process result (Ev3) of the motion detection process unit 111C to the operation confirmation process unit 111D (Q4). Herein, the contract matching process unit 111B present between the allotment process unit 111A and the operation confirmation process unit 111D has a plurality of (two) the subsequent process units. Further, the processes from the allotment process unit 111A to the e-mail delivery matching process unit 111E are not skipped, and hence the process information 122A does not receive the skip determination information on the e-mail delivery matching process unit 111E. Consequently, in the example in FIG. 27, the allotment process unit 111A is not able to recognize that the e-mail delivery matching process unit 111E as the subsequent process unit of the contract matching process unit 111B is present based only on the process information 122A.

To cope with this, when the allotment process unit 111A transmits the process result of the process of the allotment process unit 111A, the allotment process unit 111A refers to the process connection information 124, and determines whether or not the process unit having a plurality of the subsequent process units is present between the allotment process unit 111A and the process unit as the transmission destination. With this, the allotment process unit 111A becomes capable of recognizing the process unit (the e-mail delivery matching process unit 111E) of which the skip determination information is not stored in the process information 122A, and transmitting the process result of the allotment process unit 111A to the process unit.

[A Specific Example of the Execution Management Process in the Second Embodiment (2)]

Figure 29:
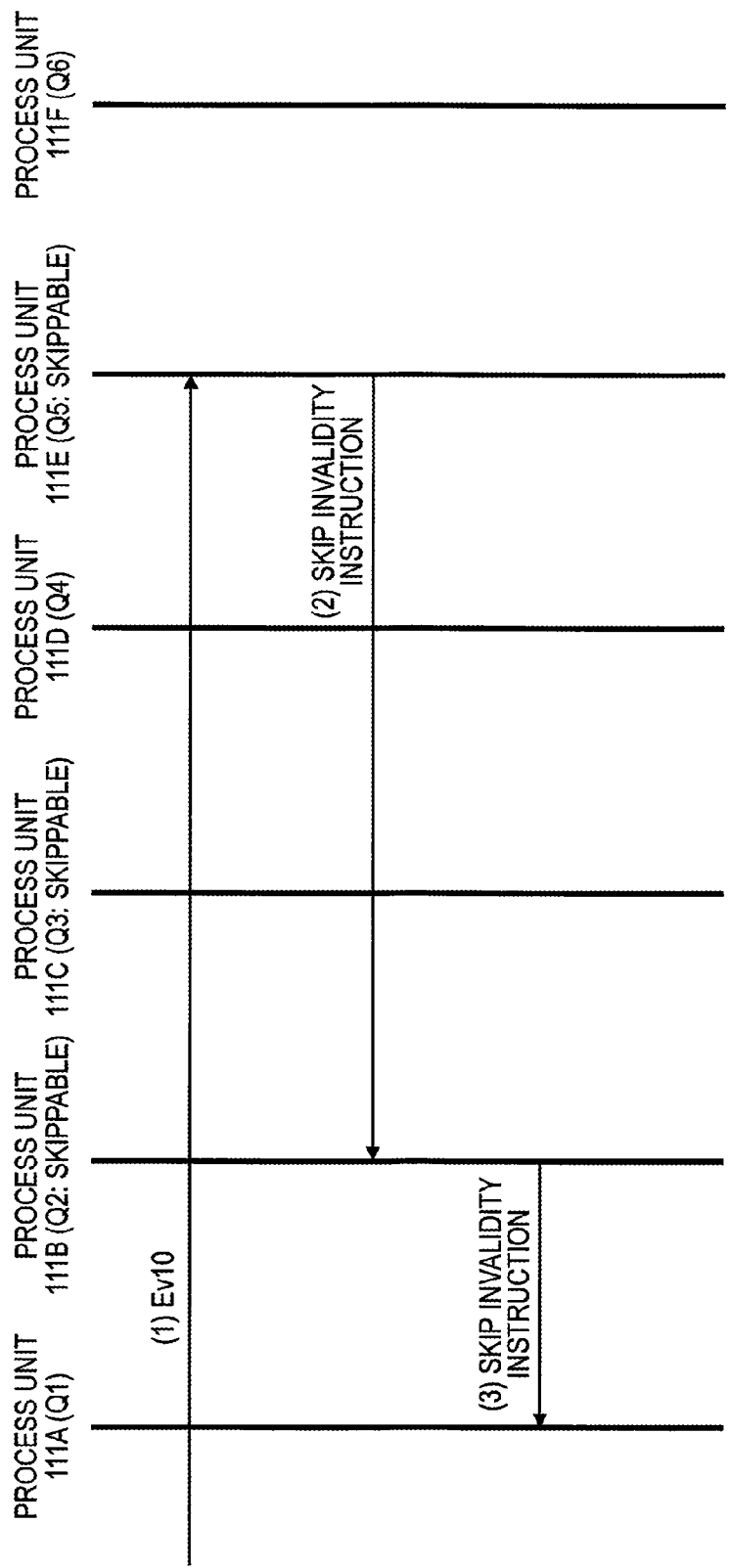
FIG. 29 is a sequence chart for explaining the skip invalidity instruction in the execution management process in the second embodiment.
Figure 30:
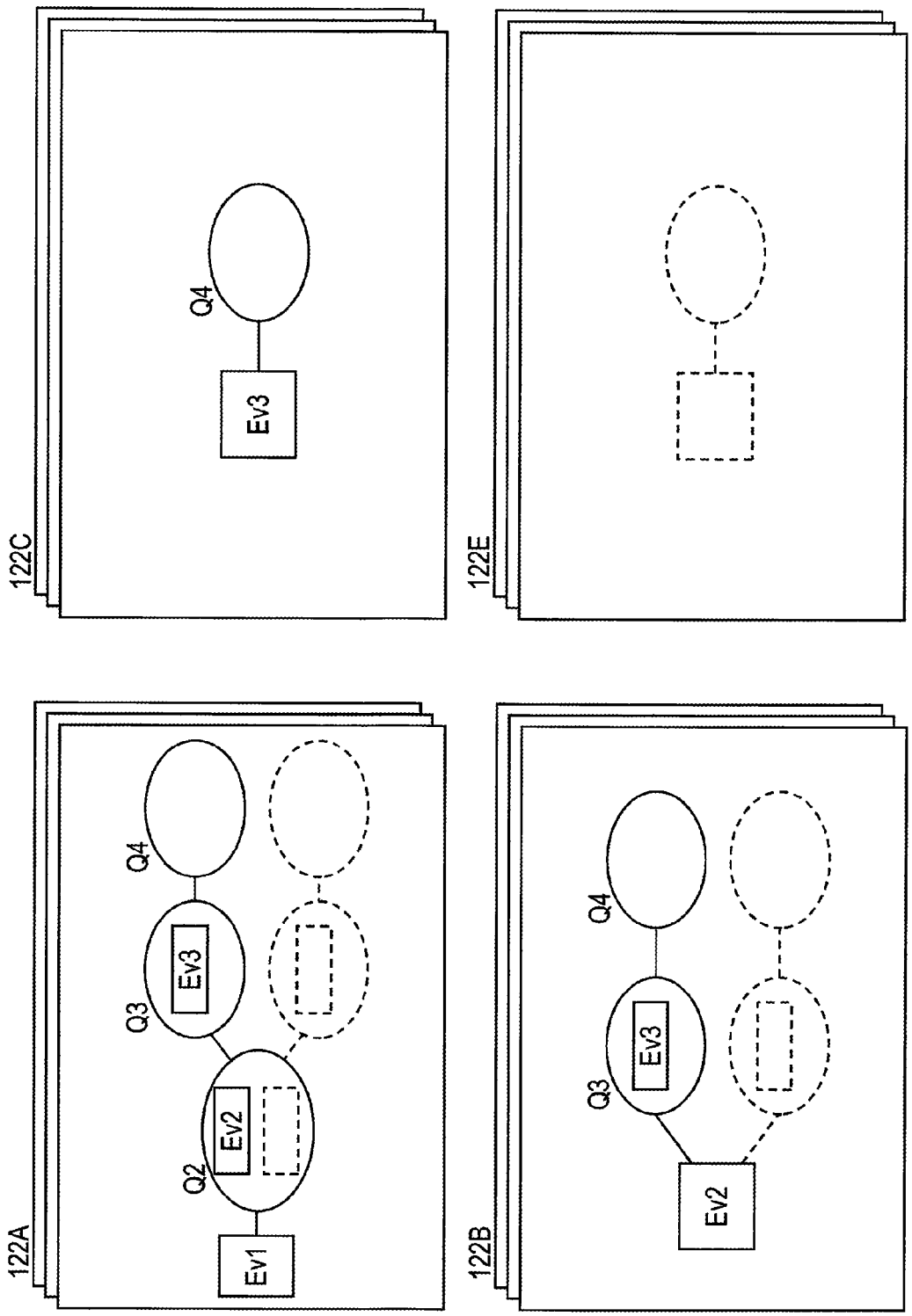
FIG. 30 is a view for explaining the process information in the second embodiment.

Next, another specific example of the execution management process in the second embodiment will be described. FIG. 29 is a sequence chart for explaining the skip invalidity instruction in the execution management process in the second embodiment. FIG. 30 is a view for explaining the process information in the second embodiment. The specific example of the skip invalidity instruction in the execution management process in FIG. 29 will be described with reference to FIGS. 22 and 30.

[The Specific Example in FIG. 29]

FIG. 29 is a view illustrating the case where the matching information update instruction (Ev10) has been transmitted to the e-mail delivery matching process unit 111E ((1) in FIG. 29). In an example in FIG. 29, the e-mail delivery matching process unit 111E having received the matching information update instruction transmits the skip invalidity instruction to the contract matching process unit 111B as the immediately prior process unit (S32, (2) in FIG. 29). Subsequently, the process result of the contract matching process unit 111B is stored in the process information 122B (YES in S41), and hence, as illustrated in FIG. 30, the contract matching process unit 111B having received the skip invalidity instruction erases the information stored in association with the process result of the contract matching process unit 111B included in the skip invalidity instruction (S42). Further, the contract matching process unit 111B transmits the skip invalidity instruction to the allotment process unit 111A as the immediately prior process unit (S43, (3) in FIG. 29). Then, the process result of the allotment process unit 111A is stored in the process information 122A (YES in S41), and hence, as illustrated in FIG. 30, the allotment process unit 111A having received the skip invalidity instruction erases the information stored in association with the process result of the allotment process unit 111A included in the skip invalidity instruction (S42). Note that, as illustrated in FIG. 30, the e-mail delivery matching process unit 111E having received the matching information update instruction may erase all of the information items stored in the process information 122E before the e-mail delivery matching process unit 111E transmits the skip invalidity instruction to the contract matching process unit 111B.

In addition, in the examples in FIGS. 29 and 30, similarly to the examples in FIGS. 27 and 28, there is a possibility of the occurrence of the state in which the contract matching process unit 111B is skipped for one of the subsequent process units, and the process result is transmitted to the other of the subsequent process units from the contract matching process unit 111B. Accordingly, the contract matching process unit 111B may suspend the transmission of the skip determination information to the prior process unit until the contract matching process unit 111B receives the process results from all of the subsequent process units. In addition, the contract matching process unit 111B may determine that the allotment process unit 111A transmits the process information to the process unit on which the information is included in the skip determination information transmitted to the allotment process unit 111A as the prior process unit.

[Third Embodiment]

Next, a third embodiment will be described. Each of FIGS. 31 and 32 is a view for explaining the execution management process in the third embodiment.

Figure 31:
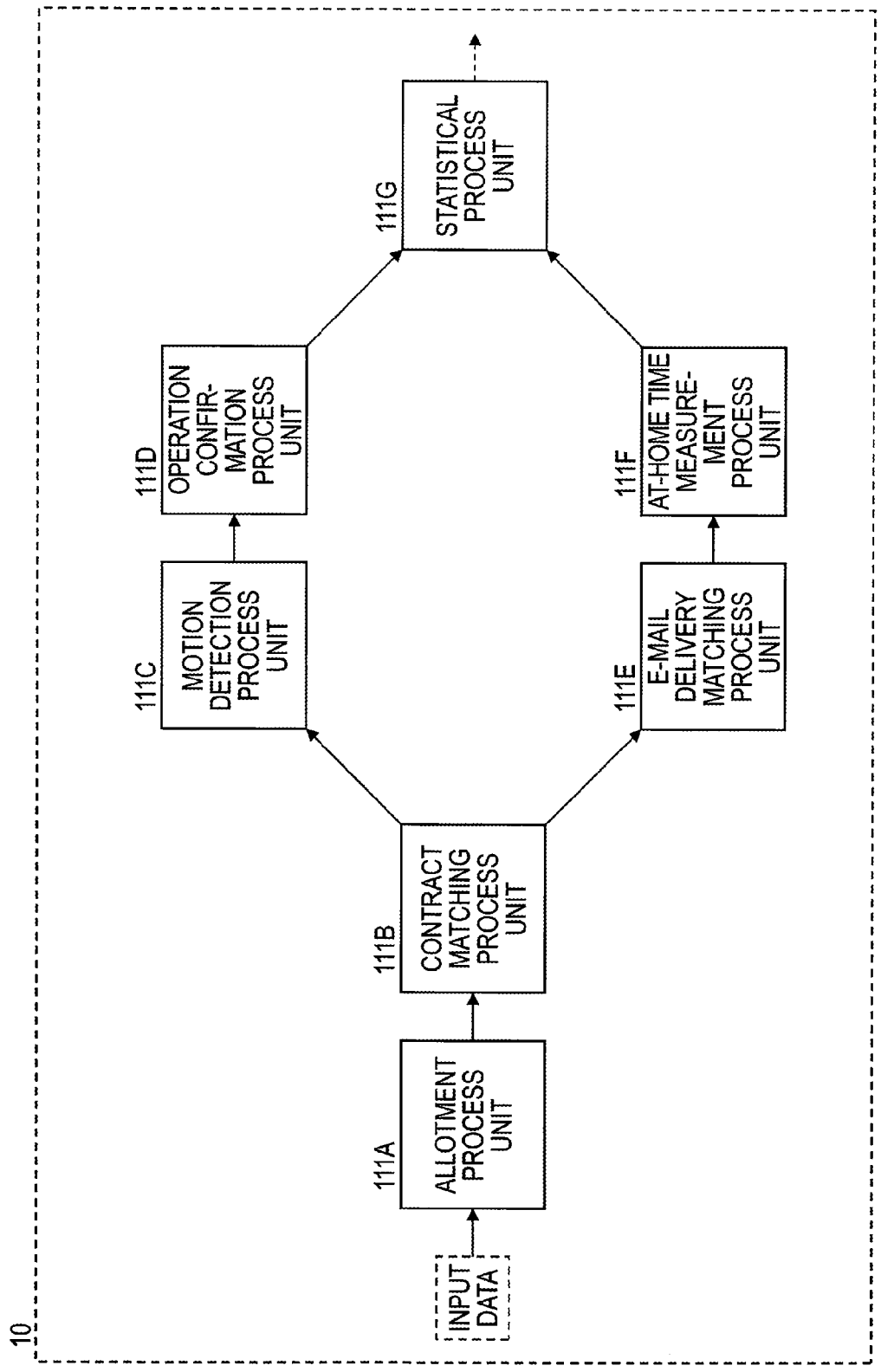
FIG. 31 is a view for explaining the execution management process in the third embodiment.
Figure 32:
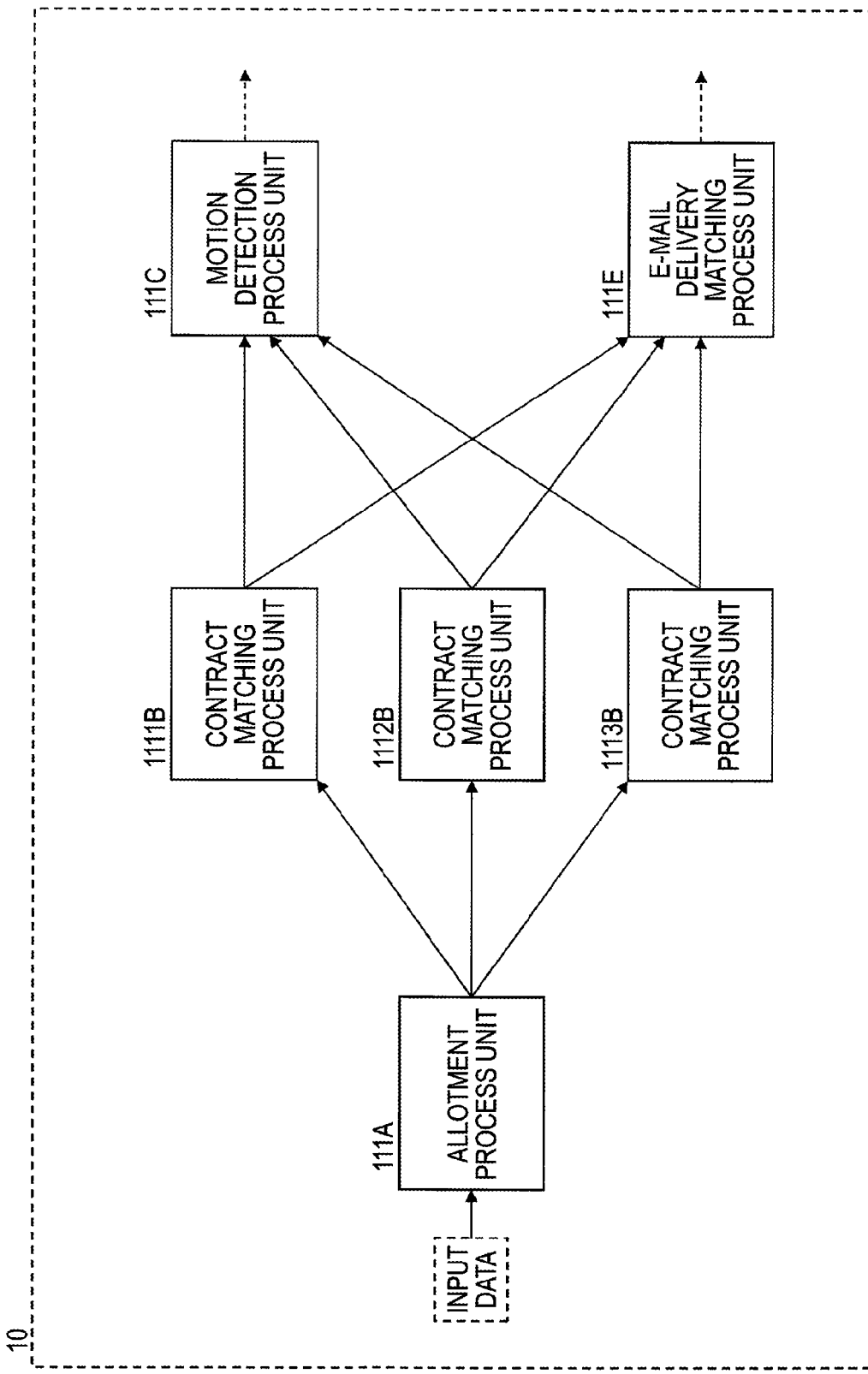
FIG. 32 is a view for explaining the execution management process in the third embodiment.

FIG. 31 is an example in the case where the process unit which receives the process results of a plurality of the process units is present. The process cooperation system 10 in FIG. 31 is different from the process cooperation system 10 in FIG. 22 in that a statistical process unit 111G is present as the subsequent process unit of the operation confirmation process unit 111D and the at-home time measurement process unit 111F. The statistical process unit 111G extracts needed information from the process results of the operation confirmation process unit 111D and the at-home time measurement process unit 111F, and generates statistical information or the like used in business analysis. The statistical process unit 111G transmits, for example, the generated statistical information to subsequent process units.

In the example in FIG. 31, the statistical process unit 111G receives the process results from the operation confirmation process unit 111D and the at-home time measurement process unit 111F, and executes its process based on the process results. Subsequently, the statistical process unit 111G generates the skip determination information for each of the operation confirmation process unit 111D and the at-home time measurement process unit 111F, and transmits the skip determination information.

Herein, as in the example in FIG. 31, in the case where the process unit which receives the process results from a plurality of the process units and performs its process is present, each process unit needs to store transmission source information of the received process result as the transmission destination information for transmitting the generated skip determination information. Accordingly, in the example in FIG. 31, each process unit transmits the process result associated with the identifier for identifying the process unit at the time of transmission of the result of the process processed by the process unit (S22 in FIG. 13). Specifically, in the example in FIG. 31, the operation confirmation process unit 111D associates the process result of its process with the identifier for identifying the operation confirmation process unit 111D and transmits the process result, and the at-home time measurement process unit 111F associates the process result of its process with the identifier for identifying the at-home time measurement process unit 111F and transmits the process result. Note that the identifier for identifying the transmission source process unit of the process result may be acquired from header information of a packet for transmitting the process result.

FIG. 32 is an example in the case where a plurality of the process units which perform the same process are present. The process cooperation system 10 in FIG. 32 has a contract matching process unit 11116, a contract matching process unit 1112B, and a contract matching process unit 1113B. That is, the allotment process unit 111A in the example in FIG. 32 determines the subsequent process unit as the transmission destination based on the remainder when the contractor ID included in the input data is divided by 3. Specifically, the allotment process unit 111A transmits the process result to the contract matching process unit 11116 when the remainder is, e.g., 0, transmits the process result to the contract matching process unit 1112B when the remainder is, e.g., 1, and transmits the process result to the contract matching process unit 1113B when the remainder is, e.g., 2. Subsequently, each contract matching process unit transmits the process result of its process to the motion detection process unit 111C and the e-mail delivery matching process unit 111E.

In the example in FIG. 32, each of the motion detection process unit 111C and the e-mail delivery matching process unit 111E receives the process results from a plurality of the process units. Herein, similarly to FIG. 31, each contract matching process unit associates the process result of the process processed by the process unit with the identifier for identifying the process unit and transmits the process result at the time of transmission of the result of the process processed by the contract matching process unit (S22 in FIG. 13). Subsequently, each of the motion detection process unit 111C and the e-mail delivery matching process unit 111E generates the skip determination information based on the process result received from each contract matching process unit, and transmits the skip determination information based on the identifier transmitted together with the process result from each contract matching process unit.

Thus, in the third embodiment, in the case where the process unit which receives the process results from a plurality of the process units and performs its process is present, at the time of transmission of the result of the process processed by the process unit, the process unit associates the process result with the identifier for identifying the process unit and transmits the process result. With this, it becomes possible for the process unit which receives the process results from a plurality of the process units to transmit the skip determination information generated based on each of the process results to each of the plurality of the process units which have transmitted the process results.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A process cooperation method comprising:
   first storing, by a first processor, in a first storage device a first process result as a result of execution of a first process, and first transmitting, by the first processor, the first process result to a second processor;
   second storing, by a second processor, in a second storage device a second process result as a result of execution of a second process based on the first process result received from the first processor, and second transmitting, by the second processor, the second process result to a third processor, and moreover other second transmitting, by the second processor, the second process result and a third identifier identifying the third processor to the first processor;
   third storing, by the first processor, in the first storage device the second process result and the third identifier received from the second processor in association with the first process result; and
   extracting, by the first processor, the second process result and the third identifier stored in association with the first process result and fourth transmitting, by the first processor, the second process result to the third processor identified by the third identifier without transmitting a process result of the first process which is executed after the third storing in the first storage device to the second processor, in a case where the process result of the first process matches the first process result stored in the first storage device.

2. The process cooperation method according to claim 1, wherein
   the other second transmitting to the first processor is performed, in a case where the second process result is uniquely determined by the first process result.

3. The process cooperation method according to claim 1, wherein
   the other second transmitting to the first processor is performed, in a case where the number of receptions of the first process result from the first processor by the second processor exceeds a predetermined threshold value.

4. The process cooperation method according to claim 1, further comprising:
   storing, by the first processor, a number of the fourth transmittings.

5. The process cooperation method according to claim 4, further comprising:
   transmitting, by the first processor, the number of the fourth transmittings to the second processor, in a case where the number of the fourth transmittings exceeds a predetermined threshold value.

6. The process cooperation method according to claim 1, further comprising:
   in a case where the second processor receives Mth to Nth identifiers respectively identifying Mth to Nth processors and process results of the (M−1)th to (N−1)th processors after the second transmitting to the third processor, M being equal to or greater than three, N being greater than M, transmitting, by the second processor, the Mth to Nth identifiers and the process results of the (M−1)th to (N−1)th processors,
   storing, by the first processor, in the first storage device the Mth to Nth identifiers and the process results of the (M−1)th to (N−1)th processors in association with the first process result, and
   in a case where a process result of the first process, which is executed after the fourth storing in the first storage device, matches the first process result stored in the first storage device, extracting, by the first processor, the Nth identifier and the (N−1)th process result stored in association with the stored first process result, and transmitting, by the first processor, the (N−1)th process result to the Nth processor identified by Nth identifier.

7. The process cooperation method according to claim 1, further comprising:
erasing, by the first processor, information stored in association with the second process result in the first storage device, in a case where there is a possibility that a process result of the second process executed after the third storing in the first storage device is different from the second process result in the first storage device.

8. The process cooperation method according to claim 6, wherein
in a case where a plurality of second processors executing based on the first process result are present, the fourth transmitting is performed by transmitting the first process result to all of the second processors until the first processor receives the second process results and the third identifiers from all of the second processors.

9. The process cooperation method according to claim 1, further comprising:
in a case where the second processor receives Mth to Nth identifiers respectively identifying Mth to Nth processors and process results of the (M−1)th to (N−1)th processors after the second transmitting to the third processor, M being equal to or greater than three, N being greater than M, transmitting, by the second processor, the Mth to Nth identifiers and the process results of the (M−1)th to (N−1)th processors,
storing, by the first processor, in the first storage device the Mth to Nth identifiers and the process results of the (M−1)th to (N−1)th processors in association with the first process result.

10. The process cooperation method according to claim 1, wherein
query processing is performed based on input data, and a result of the query processing is outputted in each of the first process, the second process, and a third process.

11. The process cooperation method according to claim 1, further comprising:
transmitting an identifier identifying the first processor to the second processor in the first transmitting to the second processor,
transmitting the identifier identifying the first processor to the third processor in the second transmitting to the third processor, and
transmitting the identifier identifying the first processor to the third processor in the fourth transmitting to the third processor.

12. The process cooperation method according to claim 1, wherein
the fourth transmitting is performed by transmitting the second process result, which is uniquely determined by the first process result, to the third processor identified by the third identifier, in a case where the process result of the first process matches the first process result stored in the first storage device.

13. A non-transitory computer-readable storage medium storing a process cooperation program for causing a computer to execute a process comprising:
storing, by a first processor, in a first storage device a first process result as a result of execution of a first process and transmitting, by the first processor, the first process result to a second processor;
storing, by a second processor, in a second storage device a second process result as a result of execution of a second process based on the first process result received from the first processor, and transmitting, by the second processor the second process result to a third processor, and moreover transmitting, by the second processor, the second process result and an identifier identifying the third processor to the first processor;
storing, by the first processor, in the first storage device the second process result and the identifier received from the second processor in association with the first process result; and
extracting, by the first processor, the second process result and the identifier stored in association with the first process result and transmitting, by the first processor, the second process result to the third processor identified by the identifier without transmitting a process result of the first process to the second processor, in a case where the process result of the first process matches the first process result stored in the first storage device.

14. A process cooperation system comprising:
a first processor,
a second processor, and
a third processor, wherein
the first processor configured to store in a first storage device a first process result as a result of execution of a first process and transmits the first process result to the second processor,
the second processor configured to store in a second storage device a second process result as a result of execution of a second process based on the first process result received from the first processor, transmit the second process result to the third processor, and transmit the second process result and an identifier identifying the third processor to the first processor,
the first processor configured to store in the first storage device the second process result and the identifier received from the second processor in association with the first process result, and
the first processor configured to extract the second process result and the identifier stored in association with the first process result, and transmit the second process result to the third processor identified by the identifier without transmitting a process result of the first process to the second processor, in a case where the process result of the first process matches the first process result stored in the first storage device.

* * * * *